United States Patent
Bray et al.

(10) Patent No.: US 9,536,325 B2
(45) Date of Patent: Jan. 3, 2017

(54) NIGHT MODE

(71) Applicant: Apple Inc., Cupertino, CA (US)

(72) Inventors: Cédric Bray, Sunnyvale, CA (US); Christopher D. Moore, San Francisco, CA (US); Patrick S. Piemonte, San Francisco, CA (US); Emanuele Vulcano, San Francisco, CA (US); Marcel van Os, San Francisco, CA (US); Billy P. Chen, Santa Clara, CA (US); Seejo K. Pylappan, Cupertino, CA (US); Justin O'Beirne, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 136 days.

(21) Appl. No.: 14/056,924

(22) Filed: Oct. 17, 2013

(65) Prior Publication Data

US 2014/0365965 A1    Dec. 11, 2014

Related U.S. Application Data

(60) Provisional application No. 61/832,917, filed on Jun. 9, 2013.

(51) Int. Cl.
*G06F 3/0482* (2013.01)
*G06T 11/00* (2006.01)
*G01C 21/36* (2006.01)

(52) U.S. Cl.
CPC ......... *G06T 11/001* (2013.01); *G01C 21/367* (2013.01); *G01C 21/3632* (2013.01); *G06F 3/0482* (2013.01)

(58) Field of Classification Search
CPC .... G06T 11/001; G06F 3/0482; G01C 21/367; G01C 21/3632
See application file for complete search history.

(56) References Cited

U.S. PATENT DOCUMENTS 6,321,158 B1    11/2001 DeLorme et al.
6,753,842 B1 *   6/2004 Williams ............. G09G 3/3406
                                                340/539.13

(Continued)

FOREIGN PATENT DOCUMENTS

EP    2672225    12/2013
EP    2672226    12/2013

(Continued)

OTHER PUBLICATIONS

Author Unknown, "Android 2.3.4 User's Guide", May 20, 2011, pp. 1-384, Google, Inc.
Author Unknown, "Garmin. nüvi 1100/1200/1300/1400 series owner's manual," Jan. 2011, 72 pages, Garmin Corporation, No. 68, Jangshu 2nd Road Sijhih, Taipei County, Taiwan.
Author Unknown, "Google Maps Voice Navigation in Singapore," software2tech, Jul. 20, 2011, 1 page, available at http://www.youtube.com/watch?v=7B9JN7BkvME.

(Continued)

*Primary Examiner* — Nicholas Augustine
*Assistant Examiner* — Parmanand Patel
(74) *Attorney, Agent, or Firm* — Adeli LLP

(57) ABSTRACT

A device that provides a map and/or navigation application that displays items on the map and/or navigation instructions differently in different modes. The applications of some embodiments provide a day mode and a night mode. In some embodiments the application uses the day mode as a default and activates the night mode when the time is after sunset at the location of the device. Some embodiments activate night mode when multiple conditions are satisfied (for example, when (1) the time is after sunset at the location of the device and (2) the ambient light level is below a threshold brightness).

24 Claims, 22 Drawing Sheets

(56) References Cited

U.S. PATENT DOCUMENTS

| | | |
|---|---|---|
| 8,355,862 B2 | 1/2013 | Matas et al. |
| 8,438,481 B2 * | 5/2013 | Lau et al. ............. 715/716 |
| 8,464,182 B2 | 6/2013 | Blumenberg et al. |
| 8,606,516 B2 | 12/2013 | Vertelney et al. |
| 8,607,167 B2 | 12/2013 | Matas et al. |
| 8,639,654 B2 | 1/2014 | Vervaet et al. |
| 8,688,367 B2 * | 4/2014 | Mauderer ............. 701/409 |
| 2004/0243307 A1 * | 12/2004 | Geelen ............. 701/213 |
| 2007/0265772 A1 * | 11/2007 | Geelen ............. 701/208 |
| 2008/0066007 A1 * | 3/2008 | Lau ............. G06F 3/0481 715/783 |
| 2008/0215234 A1 * | 9/2008 | Geelen ............. 701/200 |
| 2010/0045704 A1 | 2/2010 | Kim |
| 2010/0213847 A1 * | 8/2010 | Biondo et al. ............. 315/82 |
| 2011/0167058 A1 * | 7/2011 | van Os ............. 707/722 |
| 2011/0196610 A1 | 8/2011 | Waldman et al. |
| 2012/0092541 A1 | 4/2012 | Tuulos et al. |
| 2014/0187220 A1 * | 7/2014 | Bond ............. H04W 64/006 455/418 |

FOREIGN PATENT DOCUMENTS

| | | |
|---|---|---|
| JP | 2008/039731 | 2/2008 |
| WO | WO 2007/101711 | 9/2007 |
| WO | WO 2011/146141 | 11/2011 |
| WO | WO 2012/034581 | 3/2012 |
| WO | WO 2013/184348 | 12/2013 |
| WO | WO 2013/184444 | 12/2013 |
| WO | WO 2013/184449 | 12/2013 |

OTHER PUBLICATIONS

Author Unknown, "'Touch & Go' Owner's Manual," Jul. 2011, 218 pages, Toyota, United Kingdom.

Ruhs, Chris, "My Favorite Android Apps: Maps," Jun. 24, 2011, 1 page, available at http://www.youtube.com/watch?v=v2aRkLkLT3s.

* cited by examiner

1601
Day Mode

1602
Night Mode Option 1

1603
Night Mode Option 2

Day Mode

1901

1903

1902

Night Mode

1904

NIGHT MODE

CLAIM OF BENEFIT TO PRIOR APPLICATIONS

This application claims benefit to U.S. Provisional Patent Application 61/832,917, filed Jun. 9, 2013, which is incorporated herein by reference.

BACKGROUND

Mobile devices with map and/or navigation applications display map and navigation data with certain sets of colors and textures. That is, the applications provide a simplified view of an area, with particular colors and textures used to depict each type of item (e.g., buildings, roads, parks, etc.). The applications use different colors and textures to depict buildings than to depict roads. The colors and textures of roads and buildings are different from the colors and textures of parks, vacant spaces, etc. These colors and settings are generally selected in order to make the map and/or navigation data easy to read at a glance. However, a set of colors and textures that are easy to understand under one set of conditions (e.g., bright colors are easily seen in daylight) may not be easy to understand under other conditions (e.g., bright colors may be blinding at night).

BRIEF SUMMARY

Some embodiments provide a map and/or navigation application on a device that displays items on the map and/or navigation instructions differently in different modes. The applications of some embodiments provide a day mode and a night mode. In some embodiments, the application uses the day mode as a default and activates the night mode when the time is after sunset at the location of the device. Some embodiments activate night mode when multiple conditions are satisfied (for example, when (1) the time is after sunset at the location of the device and (2) the ambient light level is below a threshold brightness).

The map/navigation applications of some embodiments provide multiple aspects of a night mode. For example, in some embodiments one aspect of a night mode is a change of styles (e.g., textures and/or colors) of items in the map (e.g., non-street areas, streets, buildings, and parks) as compared to the styles used in a day mode. In some embodiments, the application provides different style templates for different modes (e.g., for night mode and day mode). The various style templates give the map an appearance better suited to low or high light levels. The applications of some embodiments animate a change from one style template to another style template (e.g., by interpolating the style templates and applying the interpolated values to the map and/or navigation instructions being displayed at the time).

In some embodiments, the map/navigation application displays different point of interest identifiers (sometimes called "location identifiers") when operating in night mode and day mode (e.g., in day mode the map/navigation application displays identifiers indicating schools and parks while in night mode the map/navigation application displays identifiers indicating bars and night clubs). In some such embodiments, the map application displays some identifiers in both day mode and night mode (e.g., restaurants).

In some embodiments, different sets of conditions trigger different aspects of night mode. For example, different styles could be triggered by the combination of time (e.g., after sunset or after 5 PM, etc.) and low ambient light levels while different point of interest identifiers could be triggered by time (e.g., after sunset or after 6 PM, etc.).

The map/navigation applications of some embodiments provide search functions. In some embodiments, the results of a search depend on what mode the application is in when the application performs a search. For example, the search could prioritize schools and parks during the day and prioritize restaurants at night. In some embodiments, the same locations prioritized for search results in a particular mode are the locations which the application prefers to display in that mode.

The map/navigation applications of some embodiments are able to interface with internal systems of a car or other vehicle. In some embodiments, when the application interfaces with a vehicle, the internal systems of the vehicle determine whether to use night mode or day mode. For example, the vehicle may command the application to enter night mode any time the vehicle headlights are on, any time the vehicle's sensors determine that the ambient light level is below a threshold, or any time either or both of those conditions are satisfied. In some such embodiments, the determination by the vehicle's internal systems overrides any contrary determination that would be reached by the device in the absence of the interface. In some embodiments, the application displays maps and/or navigation instructions on a display of the vehicle instead of, or in addition to, displaying the maps and/or navigation instructions on a display of the device.

Some embodiments provide a night mode and a day mode in applications other than a map/navigation application. For example, some embodiments provide a night mode and a day mode in a search engine, such that the order of the results is different at night than during the day. Some embodiments provide a night mode and a day mode in an application launching graphical user interface (GUI). In some embodiments, the GUI displays the application launching icons in a different order in night mode than in day mode.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE FIGURES

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to be identical to the embodiments set forth and that the invention may be practiced without some of the specific details and examples discussed. It will be clear to one of ordinary skill in the art that various controls depicted in the figures are examples of controls provided for reasons of clarity. Other embodiments may use other controls while remaining within the scope of the present embodiment. For example, a control depicted herein as a hardware control may be provided as a software icon control in some embodiments, or vice versa. Similarly, the embodiments are not limited to using only the various indicators and icons depicted in the figures.

Figure 1:
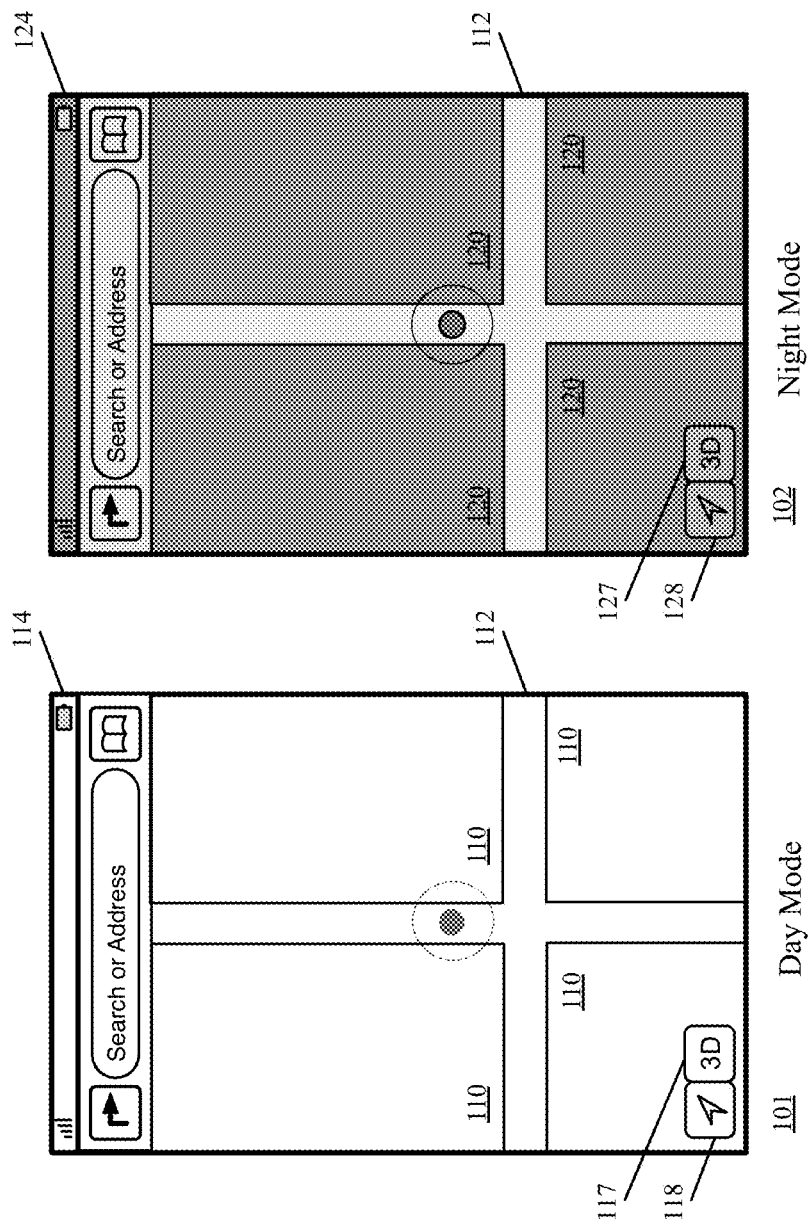
FIG. 1 illustrates two modes of displaying a map in a map/navigation application.

Map/navigation applications of some embodiments provide two or more modes of displaying maps and/or navigation instructions. FIG. 1 illustrates two modes of displaying a map in a map/navigation application. The figure illustrates the application in a day mode 101 and a night mode 102. The day mode 101 includes bright areas 110 on the sides of the streets 112, whereas the night mode 102 includes dim areas 120 on the sides of the streets 112. In addition, the status bar 114 and controls 117 and 118 in the day mode 101 are bright, while the status bar 124 and controls 127 and 128 in the night mode 102 are dim. The controls 117, 118, 127, and 128 are toggles. The "3D" toggles 117 and 127 switch between a two-dimensional display option (active in e.g., FIG. 1) and a three-dimensional display option (active in e.g., FIG. 3, below). The location toggles 118 and 128 switch between a state in which the map automatically stays centered on a present location, a state in which the map also orients itself so that the top of the map is in the direction the user is facing, and a state in which the map does not automatically stay centered on a present location or orient itself. The toggle 118 is off in this figure. In some embodiments, the map application brightens and darkens the status bars 114 and 124 and some or all controls 117, 118, 127, and 128 that are toggled to "off" along with the areas 110 and 120. However, the increase in brightness in day mode and/or decrease in brightness in night mode is not necessarily identical. That is, the controls 127 and 128 and/or the status bar 124 may be darkened more (or darkened less) in night mode 102 than the areas 120. In other embodiments, changes to the color or texture of the controls and status bar are independent of the changes to the map items (road, non-road areas, etc.).

One advantage of the difference in the modes is that the day mode 101 is displayed during the day, when the lighting is bright. Therefore, the map/navigation screen of some embodiments is bright in order to be seen clearly. In contrast, at night a bright screen is likely to be overwhelming to a user whose eyes have adjusted to the dark. Additionally, too bright a screen can temporarily undo a user's adjustment to the dark, effectively temporarily blinding them in the low light conditions at night. Accordingly, at night, the map items in a night mode of some embodiments are darker than in the day mode. However, in other embodiments, the map items are darker in the day mode or merely a different color and/or texture in night mode than in day mode.

The map/navigation applications of some embodiments provide day and night modes in a navigation mode. In some embodiments, a map/navigation application provides several different navigation modes (e.g., a 2D turn-by-turn view, a 3D turn-by-turn view, an overview, etc.). The application in some embodiments generates the turn-by-turn views from a perspective rendering position within a 3D navigation scene that the device renders. This perspective rendering position in some embodiments is adjustable and can be viewed as a virtual camera that can capture the 3D navigation scene from a variety of different perspectives (e.g., from a variety of different positions and orientations). Accordingly, in some embodiments, the turn-by-turn navigation is an animated rendering of a navigated route that is rendered from the vantage point of a virtual camera that traverses along the direction of the route based on the traversal direction and speed of the user carrying the device, which in some embodiments is captured by directional data (e.g., GPS data, triangulated cell-tower data, etc.) associated with the device.

During navigation, the navigation application of some embodiments allows a user to change the position of the virtual camera (i.e., the position from which the navigated route is rendered) through gestural input on the device's screen. Movement of the virtual camera (i.e., movement of the position from which the route is rendered) allows the navigation application to present an alternative 3D view. Some embodiments even use the virtual camera to render a top-down 2D view for the turn-by-turn navigation, while other embodiments render the top-down 2D view by zooming in and out of a 2D map.

Figure 2:
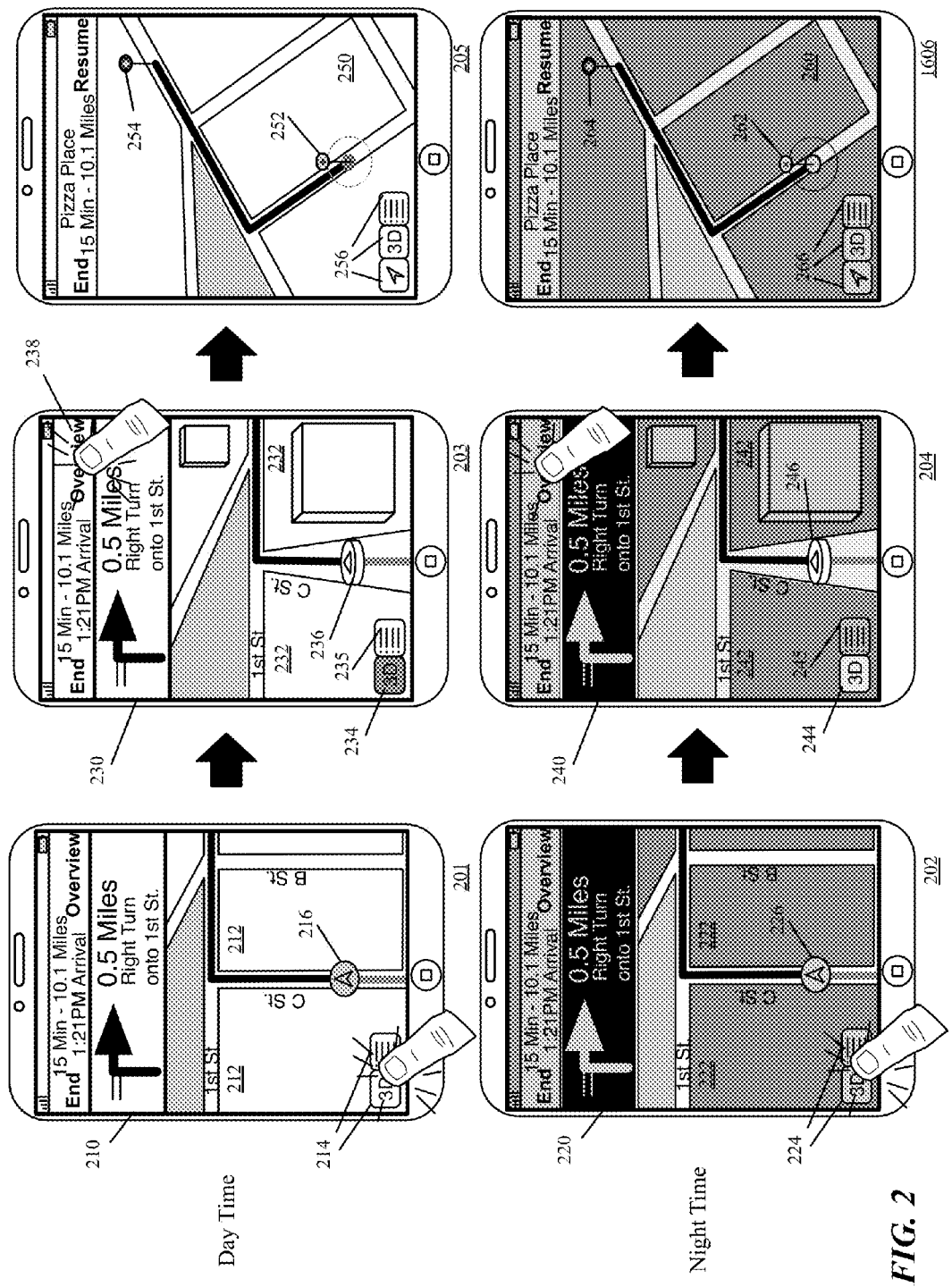
FIG. 2 illustrates differences between night mode and day mode in 2D, 3D, and overview navigation modes of some embodiments.

FIG. 2 illustrates differences between night mode and day mode in several different navigation modes of some embodiments. The figure includes night mode and day mode versions of 2D, 3D and overview navigation modes. The figure includes a day mode 201 of a 2D navigation mode, a night mode 202 of a 2D navigation mode, a day mode 203 of a 3D navigation mode, a night mode 204 of a 3D navigation mode, an overview day mode 205 and an overview night mode 206.

In the turn-by-turn navigation mode shown in 2D modes 201 and 202 and 3D modes 203 and 204, the application displays a local area of the device along with an instruction identifying the next turn. In the overview modes 205 and 206 of some embodiments, the application displays an entire planned route, including a current location pin and a destination pin. In some embodiments a user switches between 2D and 3D modes by activating or deactivating a 3D control 234. Similarly, in some embodiments a user switches from the 2D or 3D navigation modes to overview mode by activating an overview control 238.

In day mode 201 of the 2D navigation modes, a background of a navigation instruction 210 is lighter than the background of the corresponding navigation instruction 220 in the night mode. The non-street areas 212 of the day mode 201 are brighter than the corresponding non-street areas 222 in the night mode 202. The controls 214 of the day mode 201 are brighter than the corresponding controls 224 in the night mode 202. The location indicator 216 of the day mode 201 is the same color as the corresponding location indicator 226 in the night mode 202. However in other embodiments, the application may display a location indicator of a day mode in a brighter color than (or darker color than) the location indicator of the day mode.

Similarly, in day mode 203 of the 3D navigation modes, a background of navigation instruction 230 is lighter than the background of the corresponding navigation instruction 240 in the night mode 204, while the non-street areas 232 of the day mode 203 are brighter than the corresponding non-street areas in the night mode 204. In this embodiment, the control is the opposite brightness when activated than when deactivated. Accordingly, controls that are dimmer in night mode when deactivated are brighter in night mode when activated, which is why the activated 3D control 234 in the day mode 203 is dimmer than the activated 3D control 244 in the night mode 204. However, the deactivated list control 235 (which switches the application to a list of all turns in the route) in the day mode 203 is brighter than the deactivated list control 245 in the night mode 204. In the embodiment of this figure, the location indicator 236 of the day mode 203 is the same color as the corresponding location indicator 246 in the night mode 204. However in other embodiments, the application provides location indicators that are not the same color (or brightness level) in both the night and day modes.

As shown in the figure, the night modes of some embodiments display different item colors from the day modes in a turn-by-turn navigation mode. The night modes of some embodiments also display different item colors in a navigation overview display. In overview day mode 205, the application displays non-street areas 250 in a bright color. In contrast, in overview night mode 206, the application displays non-street areas 260 in a dark color.

In the illustrated embodiment, the color of the destination pin 254 in the overview day mode 205 is the same as the color of the destination pin 264 in the overview night mode. Similarly, the color of the current location pin 252 in the overview day mode 205 is the same as the color of the current location pin 262 in the overview night mode. However, in some embodiments, the navigation application displays the destination pins in different colors in night mode and day mode so that the destination pins stand out more clearly against the backgrounds of the mode in which they are displayed. Similarly, the applications of some embodiments also change the color of the current location pins to de-emphasize the current location pins against the background. That is, the application makes the destination pins stand out more than the current location pins, regardless of whether the application is in night mode or day mode. Controls 256 in the overview day mode 205 are bright, while controls 266 in the overview night mode 206 are darker in order to coordinate the controls with the background in their respective modes.

In the 2D, 3D, and overview modes of FIG. 2, particular items in the night mode are shown as being darker or brighter than in the day mode. However, one of ordinary skill in the art will understand that in other embodiments, different shading styles may be used (e.g., the non-street areas could be displayed as brighter in the night mode than in the day mode). Similarly, in some embodiments some items depicted as different colors in the different modes in some embodiments are displayed in the same colors in different modes in other embodiments. Similarly, items in different modes could be shown in the same color but in different textures (e.g., striped or checkered) in some embodiments.

Figure 3:
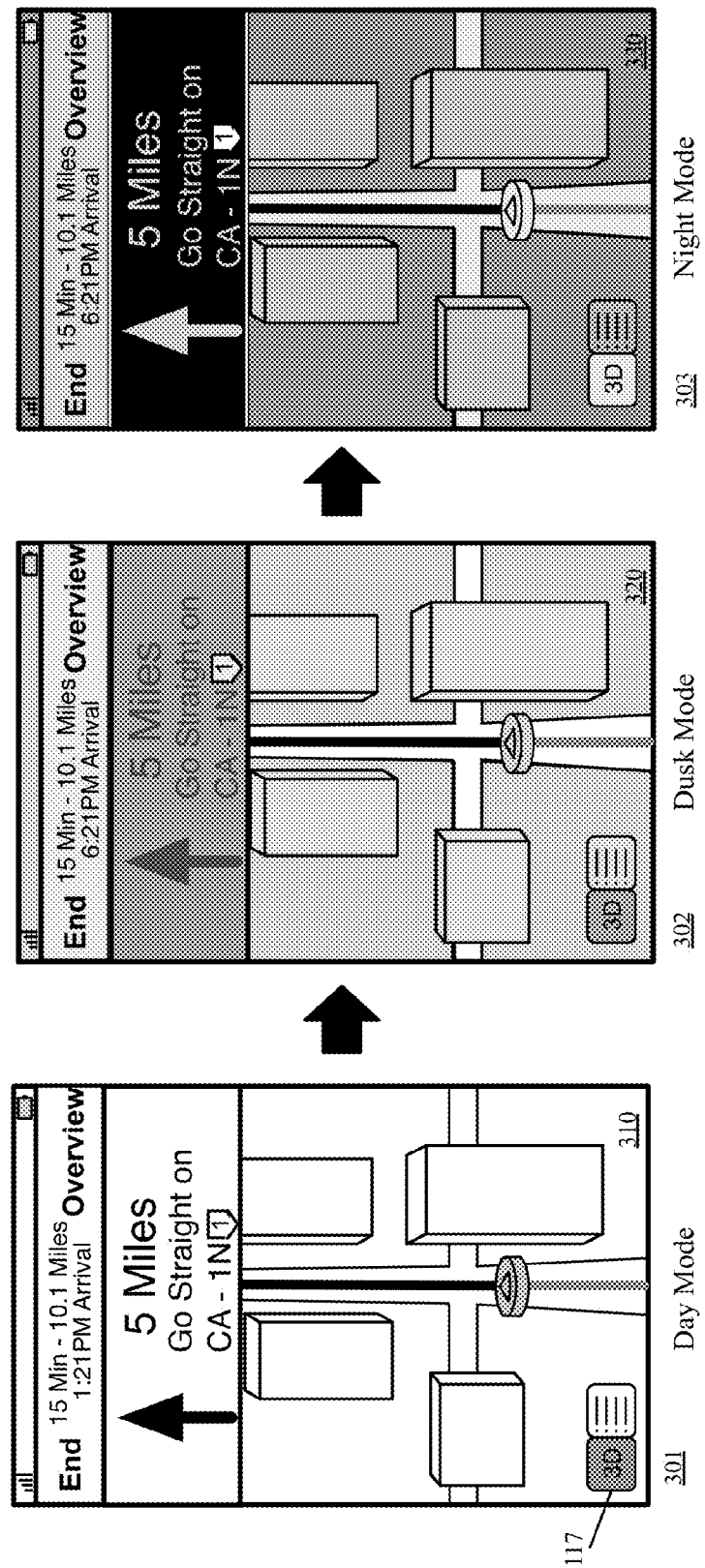
FIG. 3 illustrates three modes of a navigation interface of a map/navigation application of some embodiments.

Just as some embodiments have different modes for day and night, some embodiments have another mode for dusk (between night and day). FIG. 3 illustrates three modes of a navigation interface of a map/navigation application of some embodiments. The figure includes a day mode 301, a dusk mode 302, and a night mode 303. In some embodiments, the dusk mode 302 displays non-street areas 320 as darker than the non-street areas 310 of the day mode 301. The dusk mode 302 of some embodiments displays the non-street areas 320 as lighter than the non-street areas 330 of night mode 303. In this figure, the 3D display option is on. In the illustrated embodiment, the brightness of a control that is toggled on, such as 3D control 117 is altered in the reverse of the way the brightness of the non-street areas is altered. That is, the toggled "on" 3D control 117 is darker in the day mode 301 than in the night mode 303 (e.g., in order to provide contrast with the map). However in other embodiments, the controls are not displayed differently in the night and day modes (e.g., in order to provide a consistent control color for the user).

Figure 4:
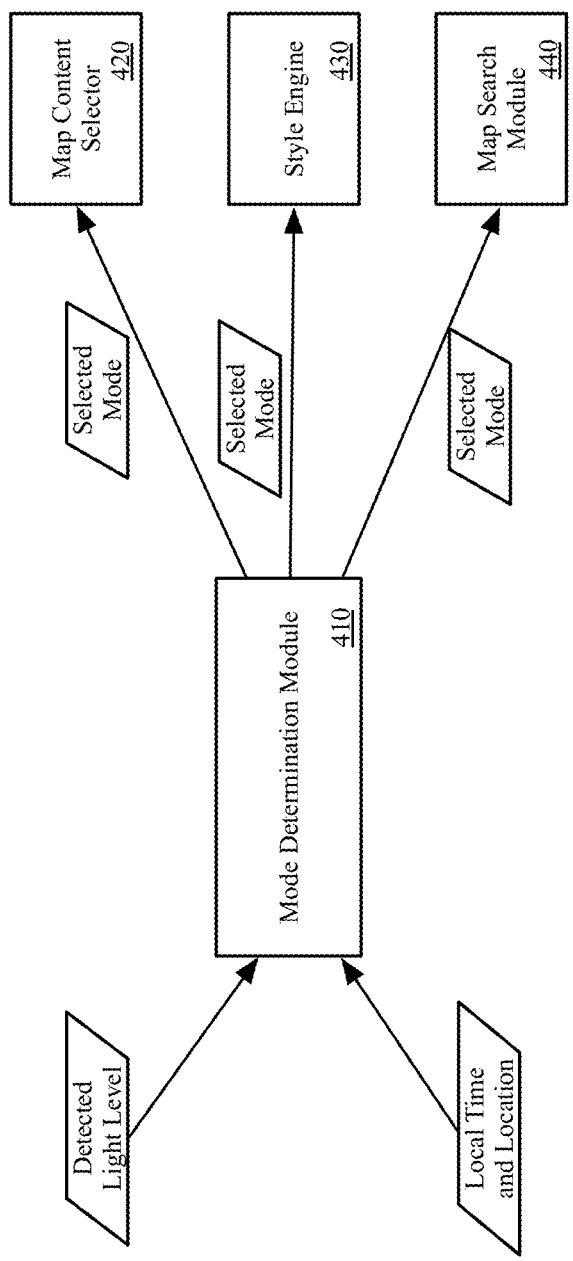
FIG. 4 illustrates a software architecture of a map/navigation application of some embodiments.

The applications of some embodiments include multiple modules that perform different operations. FIG. 4 illustrates a software module diagram of part of a map/navigation application of some embodiments. The figure illustrates a small portion of a much larger application of some embodiments. The figure includes mode determination module 410, map content selector 420, style engine 430, and map search module 440. The mode determination module 410 determines which mode (e.g., night mode or day mode, driving mode or public transportation mode, etc.) the application should use. The map content selector 420 determines which point of interest identifiers (e.g., identifiers indicating a park, a restaurant, a bar, etc.) should be displayed on a map. The style engine 430 determines which style templates to use when the application displays a map. The map search module 440 determines what results the application should be displayed after a search and in what order the application should display them.

The mode determination module 410 of some embodiments receives data that the module 410 then uses to determine what mode an application should be in. In the illustrated embodiment, that data includes the time and location of the device that the application is running on and the detected light levels. In some embodiments, the time comes from a clock of the device; the location comes from a GPS of the device, user input, triangulation of cellular towers, or some other source; and the light levels come from an ambient light sensor or other optical sensor. Other embodiments may provide other types of data to a mode determination module. In some embodiments the other data comes from one or more of user input, sensors of the device, from an external device (e.g., a vehicle interface), and/or a server. The mode determination module 410 uses the data to determine what mode the application should display (e.g., when it is after sundown and dark, the mode determination module 410 will select night mode). Once the mode determination module 410 selects a mode, it sends that selection to the map content selector 420, style engine 430, and map search module 440.

The map content selector 420 receives the selection of the mode from the mode determination module 410. The map content selector 420 then identifies a set of point of interest identifiers relevant to the selected mode (e.g., bars in night mode, parks in day mode). The application then displays the selected identifiers on portions of the map corresponding to the identifiers (e.g., bar identifiers on bars, park identifiers on parks).

The style engine 430 receives the selected mode from the mode determination module 410. The style engine 430 identifies and/or generates style templates to use when displaying the map. The style templates identify attributes (e.g., color, texture, etc.) of map items that the application will display, which may differ between different modes (e.g., the color of roads in night mode and day mode may differ). The style templates of some embodiments may be provided for the selected modes by a database, or may be generated by the style engine 430 from multiple templates in a database.

The map search module 440 receives the selected mode from the mode determination module 410. The map search module 440 identifies locations on the map that are relevant to the selected mode. In some embodiments, the map search module 440 provides a list of the locations, emphasizing locations relevant to the selected mode, to one or more other modules of the application (not shown) that then provide the list to the user.

Figure 5:
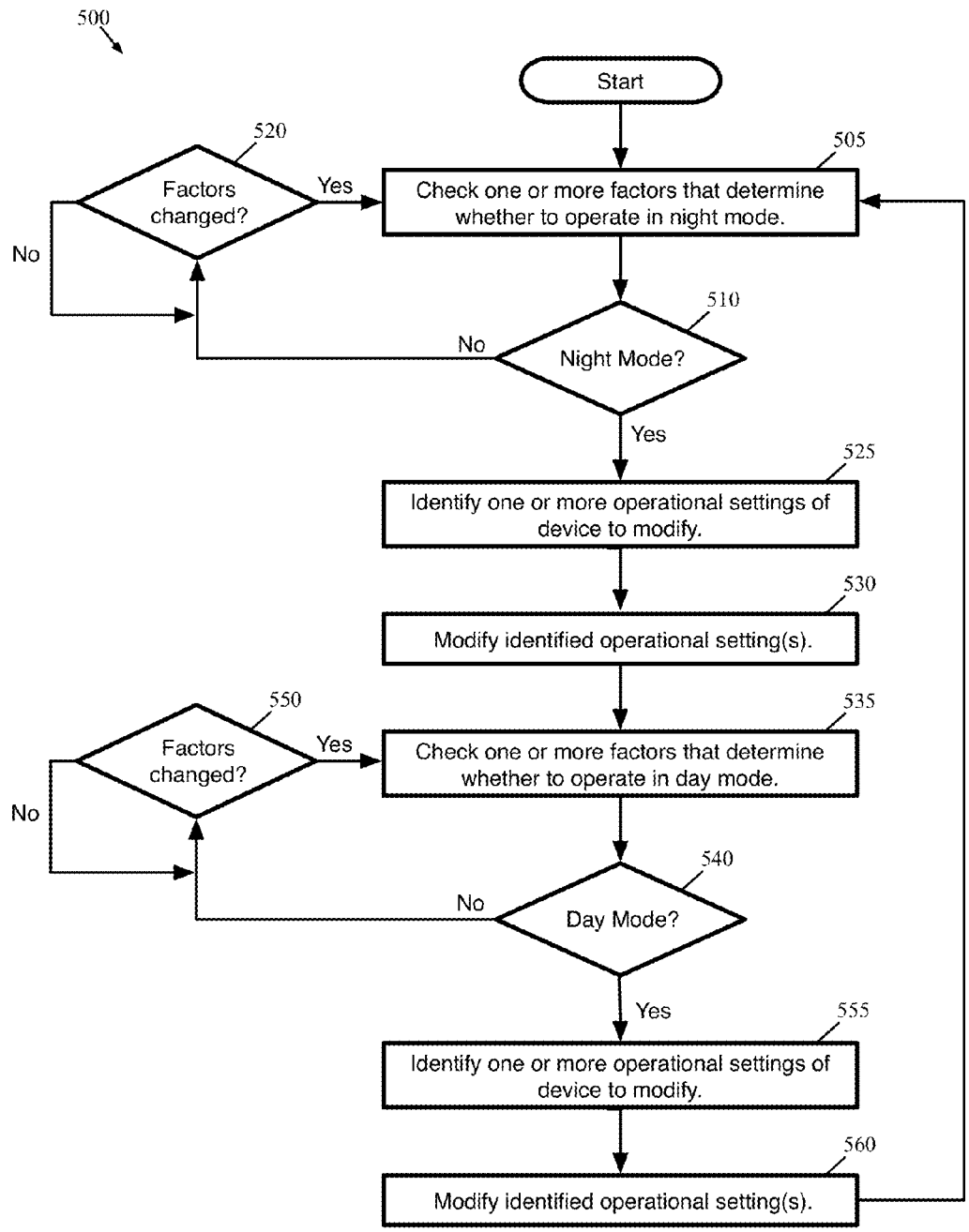
FIG. 5 conceptually illustrates a process of some embodiments for determining whether to switch from day mode to night mode and from night mode to day mode.

In various embodiments, the application uses various factors (e.g., time, light level, etc.) to determine whether to use night mode or day mode. FIG. 5 conceptually illustrates a process 500 of some embodiments for determining whether to switch from day mode to night mode and from night mode to day mode. The process 500 is cyclical, so it could potentially begin in a night mode or a day mode, but for ease of description, the illustrated process 500 begins in a day mode and then determines whether to switch to a night mode.

The process 500 checks (at 505) one or more factors that determine whether to use night mode. The process 500 of some embodiments checks the time, the light levels, local sunset time, etc. The process 500 then determines (at 510), based on the checked factors, whether the application running on a device should be operating in night mode. When the process 500 determines (at 510) that the application should not be operating in night mode, the process 500 determines (at 520) whether any factors (e.g., time, light level, etc.) that affect the determination of what mode the application should use have changed. Until one or more factors have changed, the process 500 continues to determine (at 520) whether the factors have changed. Once the process 500 determines (at 520) that one or more factors have changed, the process 500 returns to operation 505 to recheck the factors that determine whether to switch to night mode.

When the process 500 determines (at 510) that the device should be operating in night mode, the process 500 changes to night mode. In order to change into night mode, the process 500 identifies (at 525) one or more operational settings (e.g., brightness, screen color, color or texture of items in the display, which items are displayed, order of items displayed, etc.) of the device to modify. The process 500 then modifies (at 530) the identified operational setting(s). Examples of operational settings of various embodiments are described further below by reference to FIGS. 6, 7, 8, 9, 10, 12, 13, 16, 17, 18, 19, and 20.

Once the device is operating in night mode, the process 500 checks (at 535) one or more factors that determine whether to operate in day mode (e.g., time, light levels, etc.). The process 500 then determines (at 540) whether the application should be operating in a day mode. When the device should not be operating in a day mode, the process 500 determines (at 550) whether any factors (e.g., time, light level, etc.) that affect the determination of what mode the application should use have changed. When no factors have changed, the process 500 continues to wait for one or more factors to change. When one or more factors changes, the process 500 again checks (at 535) the one or more factors that determine whether to operate in day mode.

When the process 500 determines (at 540) that day mode should be enabled, the process 500 changes to day mode. In order to change into day mode, the process 500 identifies (at 555) one or more operational settings (e.g., brightness, screen color, color or texture of items in the display, order of items, etc.) of the device to modify. The process 500 then modifies (at 560) the identified operational setting(s).

The process 500 then returns to operation 505 to again check whether one or more attributes indicate that nighttime operation should begin. In some embodiments, instead of returning to operation 505 immediately, the process 500 waits for one of the factors to change (e.g., the process returns to operation 520 instead of operation 505) before again checking to see whether the device should switch back to night mode.

Section I describes a method of determining whether to use night mode. Section II describes the use of style templates to display maps in different modes. Section III then describes a rendering pipeline of some embodiments. Section IV describes how the application produces different results (e.g., different layers of map content) in different modes. Section IV also describes how various applications produce different results when performing searches in different modes. Section V describes a mobile device used to implement applications of some embodiments. Section VI describes a computer system used to implement applications of some embodiments.

I. Method of Determining Whether to Use Night Mode

Various map/navigation applications use one or more different sets of conditions. A set of conditions is one or more factors that the application uses to determine whether to switch between night mode and day mode. In some embodiments the applications use different sets of factors depending on circumstances (e.g., whether the device that is running the application is connected to a vehicle).

A. Map/Navigation Application on a Device

Figure 6:
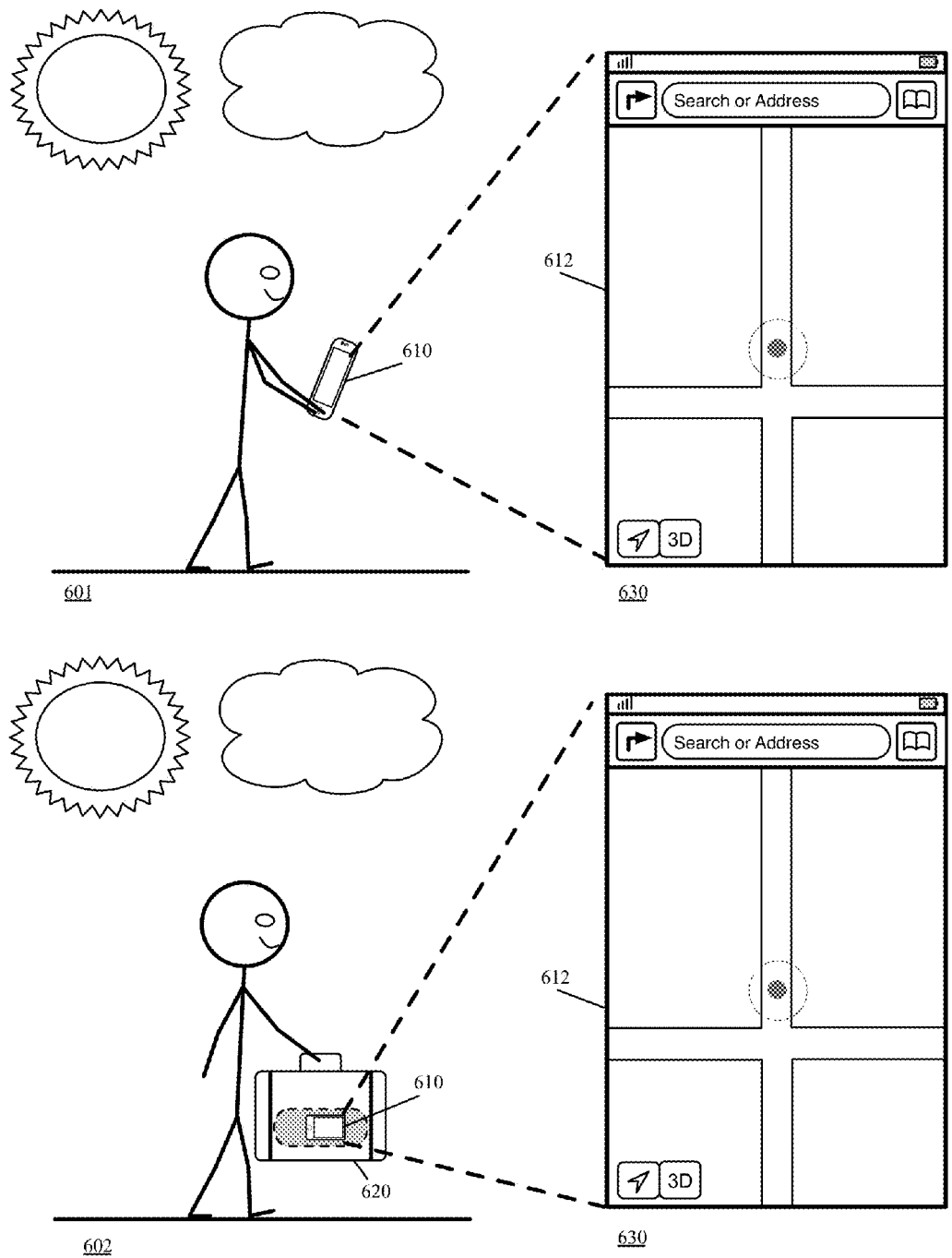
FIG. 6 illustrates a map/navigation application's determination of which mode to enter during different lighting conditions in the daytime.
Figure 7:
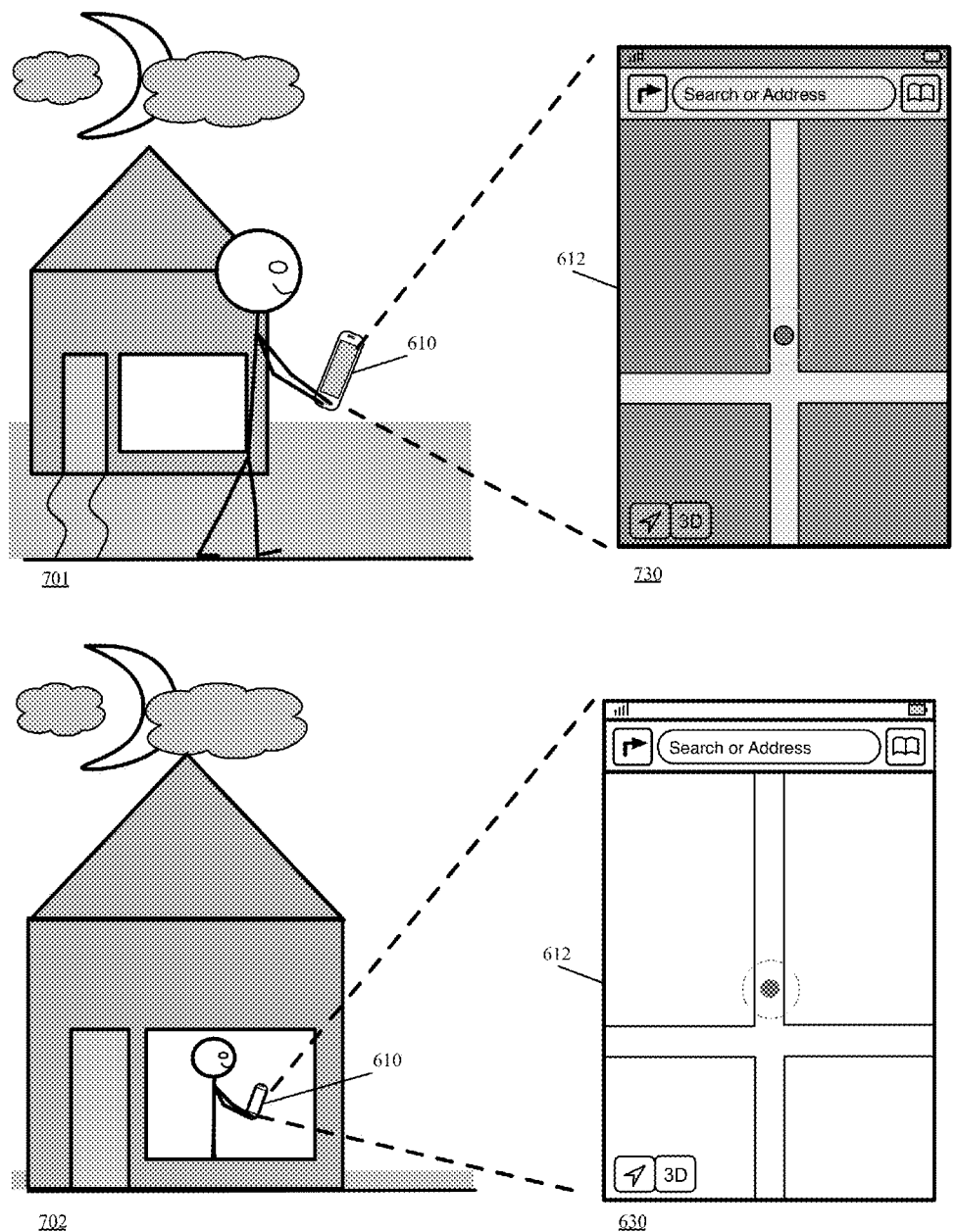
FIG. 7 illustrates a map/navigation application's determination of what mode to enter during different lighting conditions in the nighttime.

In some embodiments, a hierarchy of attributes determines whether to enter a night mode. For example, the applications of some embodiments determine whether to use night mode primarily based on the time, and secondarily based on lighting conditions. That is, in some embodiments, the application uses day mode any time during the day, and uses night mode only when it is both nighttime and a sensor of the device reports that there is little external light. FIGS. 6 and 7 illustrate this hierarchy. FIG. 6 illustrates a map/navigation application's determination of which mode to enter during different lighting conditions in the daytime. FIG. 6 includes two scenarios 601 and 602. In scenario 601, a device 610 running a map/navigation application 612 is active during the day and is out in the daylight. In scenario 602, the device 610 running the map/navigation application is active during the day and is in a closed, dark container 620. In both scenarios 601 and 602, the device 610 is operating in day mode 630. This demonstrates that in this embodiment, operating in the daytime overrides any readings from an ambient light sensor (not shown) of the device 610 when the map/navigation application determines whether to operate in night mode or day mode 630.

FIG. 7 illustrates a map/navigation application's determination of what mode to enter during different lighting conditions in the nighttime. FIG. 7 includes two scenarios 701 and 702. In scenario 701, the device 610 is active during the night and is out in the darkness. In scenario 702, the device 710 is active during the night and is in a brightly lit house 720. In scenario 701, when the device is operating at night and in the dark, the map/navigation application 612 is in night mode 730. In scenario 702, when the device 610 is operating at night but in the light, the map/navigation application 612 is in the day mode 630. This demonstrates that operating in the nighttime does not override the lighting conditions determined by an ambient light sensor (not shown) of the device 610 when determining whether to operate in night mode 730 or day mode 630.

B. Map/Navigation Application on a Device in a Vehicle

In addition to operating as standalone map/navigation devices, devices of some embodiments are capable of interfacing with internal systems of an automobile, truck, boat or other vehicle. The map/navigation applications of some embodiments utilize sensors of the vehicles to determine whether to enter night mode or day mode. In some embodiments, when interfacing with a vehicle, the factors that the application otherwise uses to determine whether to use night mode or day mode do not affect the determination of whether to use night mode or day mode. In such embodiments, the vehicle's determination (e.g., made by an external light sensor) overrides the other factors.

A vehicle interface allows a car or other vehicle to communicate with the map/navigation applications of some embodiments. In some embodiments, both the screen of the device running the map/navigation application and a screen built into the vehicle display the maps and/or navigation instructions generated by the application. In other embodiments, the display of the device running the application provides navigation instructions while interfacing with the vehicle and a screen of the vehicle displays the maps and/or navigation instructions.

Figure 8:
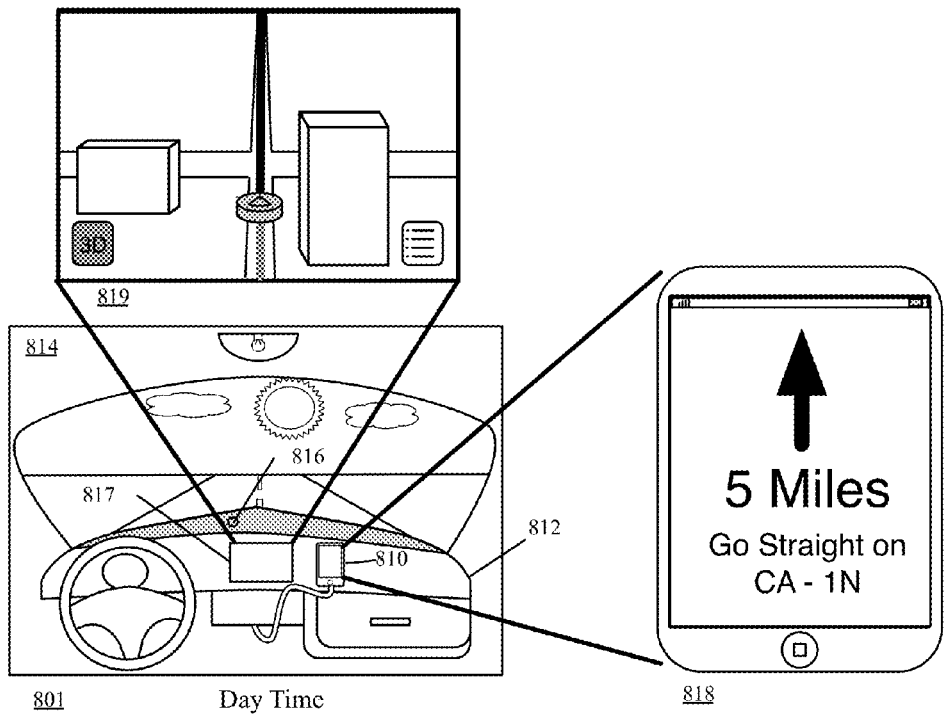
FIG. 8 illustrates the determination of day mode versus night mode made by a car external light sensor during the day and night.
Figure 8:
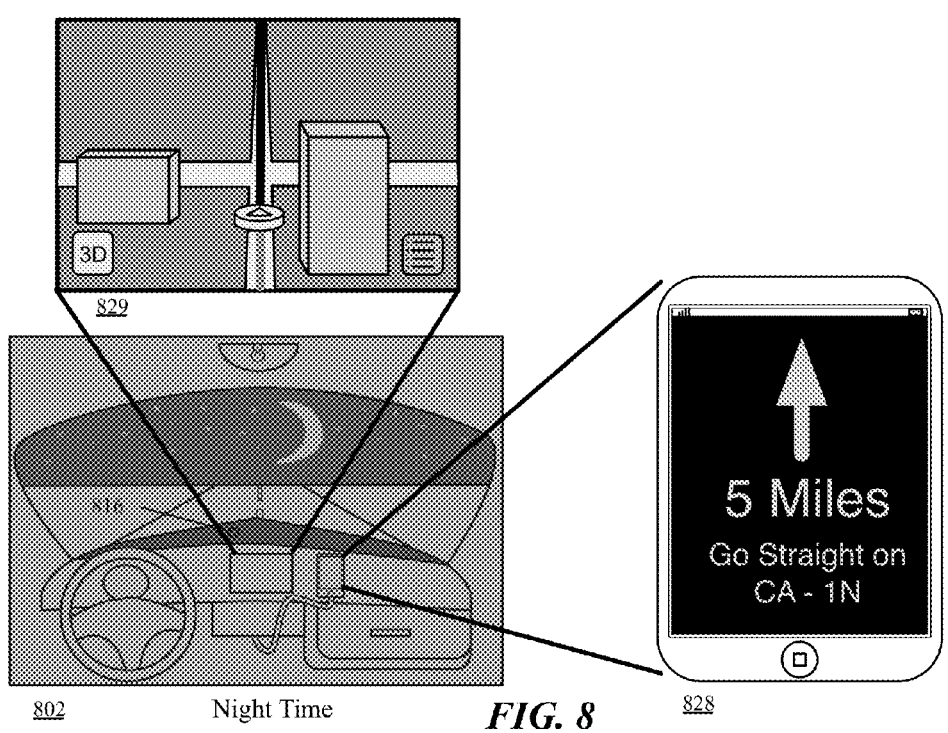

FIG. 8 illustrates the determination of day mode versus night mode made by a car external light sensor 816 during the day and at night. The figure includes two scenarios 801 and 802. In scenario 801, the device 810 is on a dashboard 812 of a car 814 and is communicatively connected to the vehicle interface system of the car 814. The car 814 is outside on a bright day. The external light sensor 816 of the car 814 identifies the light level as high and the car 814 commands the device 810 to operate in a day mode 818. The map/navigation application running on device 810 therefore runs in day mode 818, displaying navigation instructions in black against a white background. Additionally, the vehicle displays, on display screen 817, map and navigation information that the map/navigation application provides to the vehicle interface system. The map/navigation application provides the map/navigation information in day mode 819 because the vehicle interface system commands the map/navigation application to operate in day mode.

In scenario 802, the device 810 is still on the dashboard 812 of the car 814 and is still communicatively connected to the vehicle interface system of the car 814. The car 814 is outside at night and is therefore in the dark. The external light sensor 816 of the car 814 identifies the light level as low and the car 814 commands the device 810 to operate in a night mode 828. The map/navigation application running on device 810 therefore runs in night mode 828, displaying navigation instructions in gray on a black background. Additionally, the vehicle displays, on display screen 817, map and navigation information that the map/navigation application provides to the vehicle interface system. The map/navigation application provides the map/navigation information in night mode 829 because the vehicle interface system commands the map/navigation application to operate in night mode.

Figure 9:
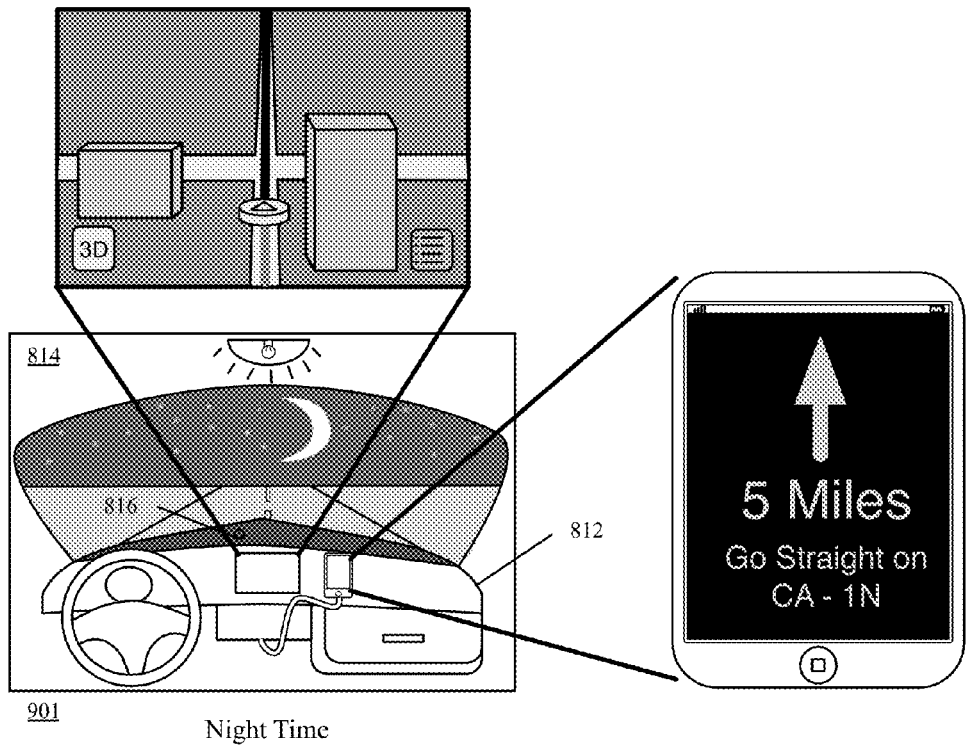
FIG. 9 illustrates the determination of day mode versus night mode made by a car external light sensor that overrides a navigation application's determination of day mode vs. night mode.
Figure 9:
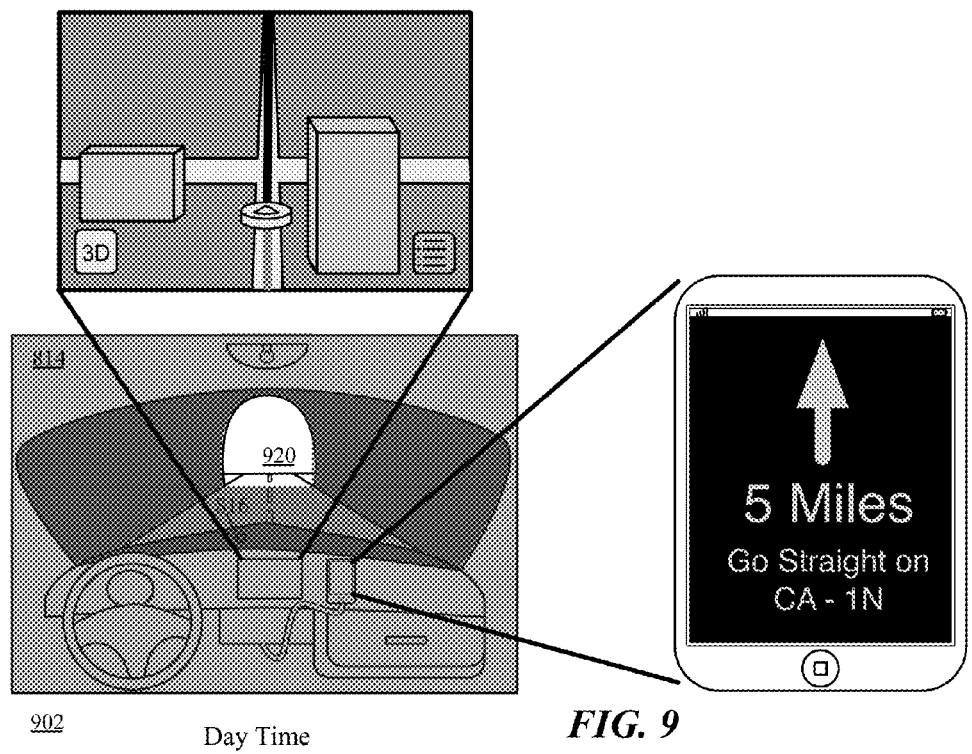

As mentioned above, in some embodiments, the vehicle's determination of day or night mode overrides the factors that the application would otherwise use to determine whether to use night mode or day mode. The devices of some embodiments allow a vehicle's determination of day or night mode to override the conditions identified by sensors of the device itself. FIG. 9 illustrates the determination of day mode versus night mode made by a car interface system, based on readings from external light sensor 816, that overrides a navigation application's determination of day mode vs. night mode. The vehicle in the embodiments of FIGS. 8 and 9 makes the determination even when there is conflicting light sensor data from the device running the application, and/or when there is a conflicting time determination. FIG. 9 includes two scenarios 901 and 902. In scenario 901, the device 810 is on the dashboard 812 of a car 814 and is communicatively connected to the vehicle interface system of the car 814. The car 814 is outside at night. The external light sensor 816 of the car 814 identifies the light level as low and the car 814 commands the device 810 to operate in a night mode 828. The map/navigation application running on device 810 therefore operates in night mode 828 and provides map information to the vehicle interface system in night mode. In this scenario, the application operates in night mode 828 even though the device 810 is in the lighted interior of the car 814. The device operates in night mode 828 in scenario 901 because the vehicle interface system overrides the factors that the device would otherwise use to determine mode (in this case light levels measured by the device 810).

In scenario 902, the device 810 is still on the dashboard 812 of a car 814 and is communicatively connected to the vehicle interface system of the car 814. In scenario 902, it is day time, but the car is in a dark tunnel 920. Therefore, the external light sensor 816 of the car 814 identifies the light level as low and the car 814 commands the device 810 to operate in night mode 828. The application then operates in night mode 828 even though the time is daytime and the applications of some embodiments would normally operate in day mode in daytime, even with the device 810 in the dark. In both FIGS. 8 and 9, the determination whether to use day or night mode is made by the vehicle interface system of the car 814. In FIG. 9, the determination by the car 814 overrides other factors (i.e., light levels measured by the device 810 and time) determined by the device 810 that would otherwise result in a different mode being used.

Different vehicles use different controls or sensors to determine whether to use night mode or day mode. The cars illustrated in FIGS. 8, 9, and 10 use an ambient light sensor, external light sensor 816, to determine whether to use night mode or day mode. Other vehicles use other sensors or controls in some embodiments. Vehicles of some embodiments provide a control that lets the driver decide whether to use night mode or day mode. Some embodiments link night mode and day mode to the headlight controls, etc. Finally, some vehicles do not determine whether a map/navigation application should use night mode or day mode, instead the device makes that determination, even when connected to the vehicle.

In some embodiments, a vehicle does not override the night mode/day mode determination of the application because the application is designed not to allow such an override. In other embodiments, the application is designed to allow an override, but the vehicle interface does not provide commands to the device identifying a mode. In some embodiments, when the device is interfaced with a vehicle that does not specify what mode the application should use, the map/navigation application defaults to day mode rather than making a determination of whether to use day mode or night mode based on factors it would normally use (e.g., time, light levels, etc.).

Figure 10:
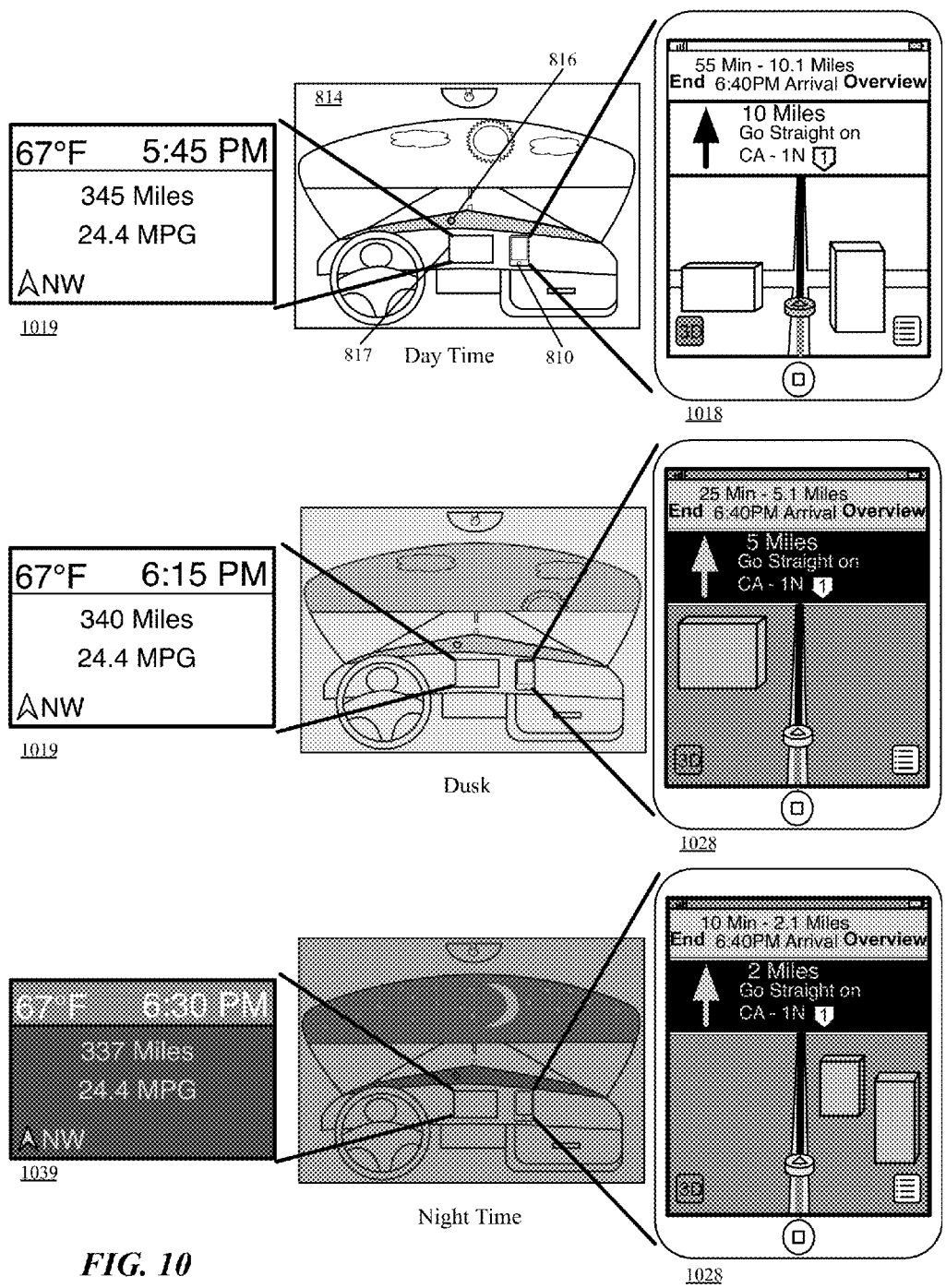
FIG. 10 illustrates a car and a navigation application on a device independently determining whether to use night mode or day mode.

FIG. 10 illustrates a car and a navigation application that make determinations of whether to use night mode or day mode independently of each other. The figure includes three scenarios 1001 (outside during the day), 1002 (outside at dusk) and 1003 (outside at night). In this figure, the car 814 has an external sensor 816 (e.g., for determining a day or night mode for the car systems) on the hood, but the car 814 does not use the sensor 816 to determine whether the map/navigation application should use night mode or day mode because the device 810 is not connected to the vehicle interface system.

In scenario 1001, the sensor 816 identifies the lighting conditions as bright, and therefore the car display 817 operates in day mode 1019. In day mode 1019, the display 817 of the car 814 displays data in black on a white background. The application of the illustrated embodiment, acting independently of the car, uses the same hierarchy as described with respect to FIG. 6. That is, in daytime, the map/navigation application on device 810 remains in day mode regardless of the light levels. Accordingly, the map/navigation application is in day mode 1018.

In scenario 1002, the sensor 816 identifies the lighting conditions as bright enough, and therefore the car operates in day mode 1019. The application of the illustrated embodiment, acting independently of the car, uses the same hierarchy as described with respect to FIG. 6. That is, after sunset, the map/navigation application on device 810 will go into night mode if the light level is low. Since the device is inside the car 814, the light levels are lower than outside the car. Accordingly, the map/navigation application is in night mode 1028. In some embodiments, the application uses different threshold light levels than the car (e.g., the device turns to night mode at brighter light levels than the car). In some cases, the exterior light levels may be brighter than the interior light levels.

In scenario 1003, the sensor 816 identifies the lighting conditions as dark, and therefore the car operates in night mode 1039. In night mode 1039, the display 817 of the car 814 displays data in white and gray on a black background. The application of the illustrated embodiment, acting independently of the car, uses the same hierarchy as described with respect to FIG. 6. That is, in nighttime, the map/navigation application on device 810 uses night mode if the light level is low. Accordingly, the map/navigation application is in night mode 1028.

C. Hierarchy for Determining Whether to Use Night Mode or Day Mode

Figure 11:
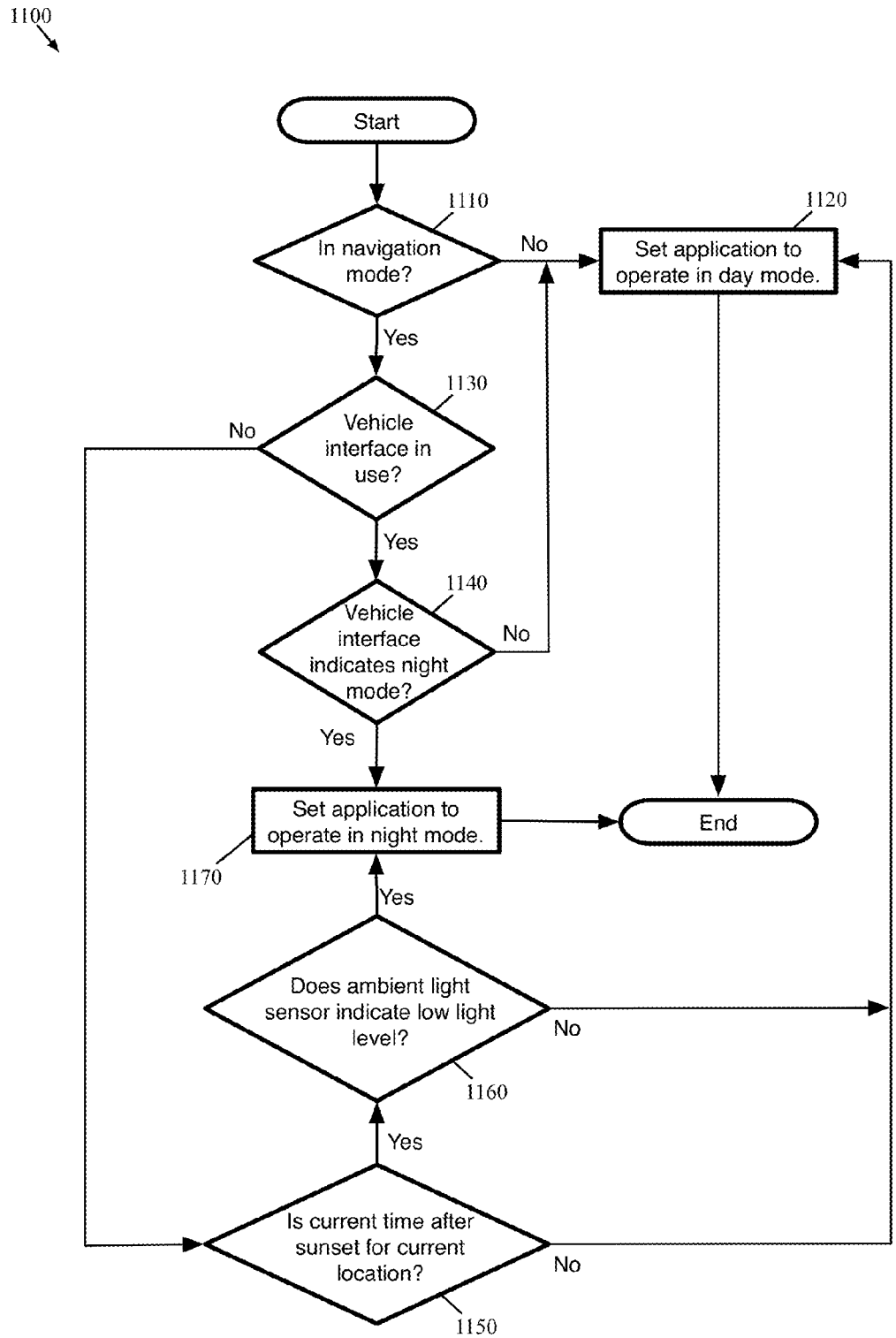
FIG. 11 conceptually illustrates a process of some embodiments for determining whether to use a night mode or a day mode in a map/navigation application running on a device.

Some embodiments provide separate night modes and day modes in a navigation mode, but not in a map mode. FIG. 11 conceptually illustrates a process 1100 of some embodiments for determining whether to use a night mode or a day mode in a map/navigation application running on a device. The process 1100 determines (at 1110) whether the map/navigation application is in a navigation mode. In some embodiments, the application provides both map modes and navigation modes. In some such embodiments, the application uses a night mode and a day mode in navigation mode, but uses only one mode (e.g., a day mode) in map mode. One of ordinary skill in the art will understand that although the processes of some embodiments use night mode and day mode for a navigation mode, but not for a map mode, the processes of other embodiments use night mode and day mode in both a map mode and a navigation mode. Embodiments that use night mode in both map and navigation modes either (1) do not make determination 1110, or (2) do not base a decision to use night mode on such a determination.

When the application is not in the navigation mode, the process 1100 sets (at 1120) the application to operate in day mode. In some embodiments, the application uses different colors or textures for the map items in day mode than it does in night mode. As shown above in FIG. 1, some embodiments use lighter or darker colors for different modes. Similarly, in some embodiments, the application displays different identifiers when using day mode than when using night mode. The process 1100 then ends.

When the process 1100 determines (at 1110) that the application is in a navigation mode, the process 1100 then determines (at 1130) whether a vehicle interface is in use. When the vehicle interface is in use (at 1130), the vehicle interface's determination overrides the other factors about whether to use night mode. Therefore, the process 1100 determines (at 1140) (e.g., by receiving a command from the vehicle interface) whether the vehicle interface commands the use of a night mode. As mentioned above, in some embodiments, the vehicle interface determines whether to use night mode based on an internal ambient light sensor of the vehicle. In other embodiments the vehicle interface determines whether to use night mode based on an external light sensor of the vehicle. In still other embodiments, the vehicle interface makes the determination based on a control set by a user of the vehicle.

When the vehicle interface commands (at 1140) the application to use a day mode, the process 1100 sets (at 1120) the application to operate in day mode and the process 1100 ends. In some embodiments, the application displays the day mode on the device. In other embodiments, the application displays the day mode on a screen of the vehicle.

When the vehicle interface commands (at 1140) the application to use a night mode, the process 1100 sets (at 1170) the application to operate in night mode and the process 1100 ends. In some embodiments, the application displays the night mode navigation displays on the device. In other embodiments, the application displays the night mode navigation displays on a screen of the vehicle.

When the process 1100 determines (at 1130) that the vehicle interface is not in use, the process 1100 then determines (at 1150) whether the current time is after sunset for the current location. In some embodiments, the process 1100 determines the current time from a clock of the device which performs the process and determines current location from a GPS receiver of the device or by triangulation of cell phone towers, or by some other method. The process 1100 of some embodiments calculates the time of sunset based on the date and location data. In other embodiments, the process 1100 determines the time of sunset by providing location data to an external server that calculates the time of sunset at the location of the device. In some embodiments, a look up table is used by the device or the server to determine the time of sunset at the location of the device.

When the current time is not after sunset at the current location of the device, the process 1100 sets (at 1120) the application to operate in day mode and the process 1100 ends. When the current time is after sunset at the current location of the device, the process 1100 determines (at 1160) whether an ambient light sensor of the device indicates a low light level. In some embodiments, the process 1100 determines that a low light level is present when the light level detected by the ambient light sensor is below a threshold. Similarly, the process 1100 determines that a high light level is present when the light level detected by the ambient light sensor is above the threshold.

When the ambient light sensor of the device indicates a low light level, the process 1100 sets (at 1170) the application to operate in night mode and the process 1100 ends. In some embodiments, the ambient light sensor is part of a camera of the device. In other embodiments, the ambient light sensor is separate from the camera of the device. When the ambient light sensor of the device does not indicate a low light level, the process 1100 sets (at 1120) the application to operate in day mode and the process 1100 ends.

While the embodiment of FIG. 11 determines (absent a vehicle interface) to use night mode only when both the time and light levels indicate that night mode should be used, processes of other embodiments use night mode if either the time or light levels indicate that night mode should be used. Processes of still other embodiments do not determine whether the time indicates that night mode should be used, but instead rely on the determination of the light levels by the ambient light sensor. In some embodiments, the determination of whether to use night mode or day mode is made by the user of the device. For example, the map/navigation applications of some embodiments include a setting (e.g., set by an override control) that allows a user to select night mode or day mode. Some applications provide a setting (e.g., set by an override control) that allows a user to select night mode, day mode, or automatic mode. In the automatic mode, the application makes the determination automatically (e.g., based on time, light levels, etc.).

II. Style Templates

The applications of some embodiments use style templates to define certain aspects of various items on the maps. The applications of some embodiments define aspects including the color and texture of the items in the style templates. Some applications use a single style sheet with multiple style templates, or a small number of style sheets that each provide multiple style templates, for the same item (e.g., a night mode style template and a day mode style template).

A. Content of Style Templates

One way to provide map data is to provide actual color images (e.g., photographs of the areas represented by the maps). In some embodiments, this method provides map data for a client device to display in a "satellite" or "overhead" mode. In some embodiments, the application displays the images in complicated ways in satellite mode, such as in a 3D map. However, such applications use photographic images as part of the basis for the 3D map "satellite" or "overhead" modes. In addition to (or instead of) a satellite mode, some embodiments display data in a representational mode. In the representational mode, the map data includes the shapes of areas on the map (e.g., as polygons or curves), and the types of areas (e.g., a park, a local road, a highway, a lake, etc.). The application running on a client device then applies a style sheet to the map data. The style sheet includes settings (called "style templates") that define what colors and textures to shade areas identified as parks (lakes, etc.), what colors and textures to use to draw the edges of such areas, what colors and textures to use on the surface and edges of each type of road, etc.

Figure 12:
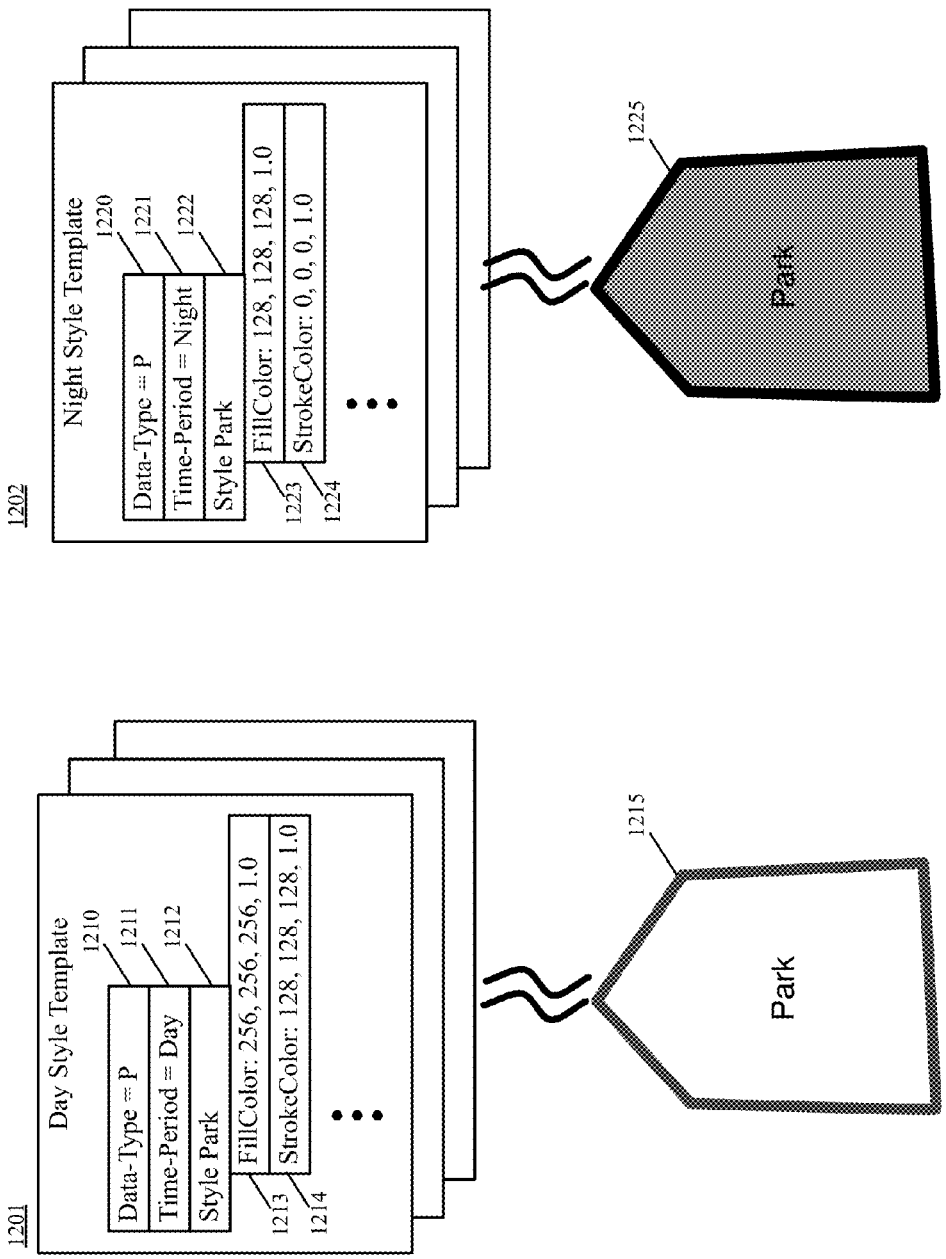
FIG. 12 conceptually illustrates style templates for night and day modes of one type of area.

In some embodiments, a style sheet includes different style templates for night and day modes. FIG. 12 conceptually illustrates style templates for night and day modes of one type of area. The figure includes day style template 1201 and night style template 1202. The day style template 1201 includes a data-type field 1210, a time period field 1211, a style field 1212, a fillcolor field 1213 and a strokecolor field 1214. The data-type field 1210 defines what type of data is affected by the style template (e.g., a building representation, a road representation or a park representation). The time period field 1211 identifies this style template as one that should only be applied when the application is working in a day mode. The style field 1212 identifies the style as applying to areas that the map data designates as parks. The fillcolor field 1213 identifies the color to use for the body of the area when the application applies this style (i.e., to park areas in day mode). In this case, the fillcolor field reads "256, 256, 256, 1.0", which in this embodiment indicates a white area that is opaque. The strokecolor field 1214 reads "128, 128, 128, 1.0", which in this embodiment indicates a gray line that is opaque. The application of the style template 1201 to a park area defined for a map is shown as park 1215. Park 1215 is a white area with a gray line around it.

The night style template 1202 includes a data-type field 1220, a time period field 1221, a style field 1222, a fillcolor field 1223 and a strokecolor field 1224. The data-type field 1220 defines what type of data is affected by the style template. The time period field 1221 identifies this style template as one that should only be applied when the application is working in a night mode. The style field 1222 identifies the style as applying to areas that the map data designates as parks. The fillcolor field 1223 identifies the color to use for the body of the area when the application applies this style (i.e., to park areas in day mode). In this case, the fillcolor field reads "128, 128, 128, 1.0", which in this embodiment indicates a gray area that is opaque. The strokecolor field 1224 reads "0, 0, 0, 1.0", which in this embodiment indicates a black line that is opaque. The application of the style template 1202 to a park area defined for a map is shown as park 1225. Park 1225 is a gray area with a black line around it. Park 1215 and park 1225 represent the same park, but with different style templates applied to the representation of the park. One of ordinary skill in the art will understand that different embodiments may include more, fewer, or different fields in a style template than the fields shown here.

B. Animation of Style Templates

Figure 13:
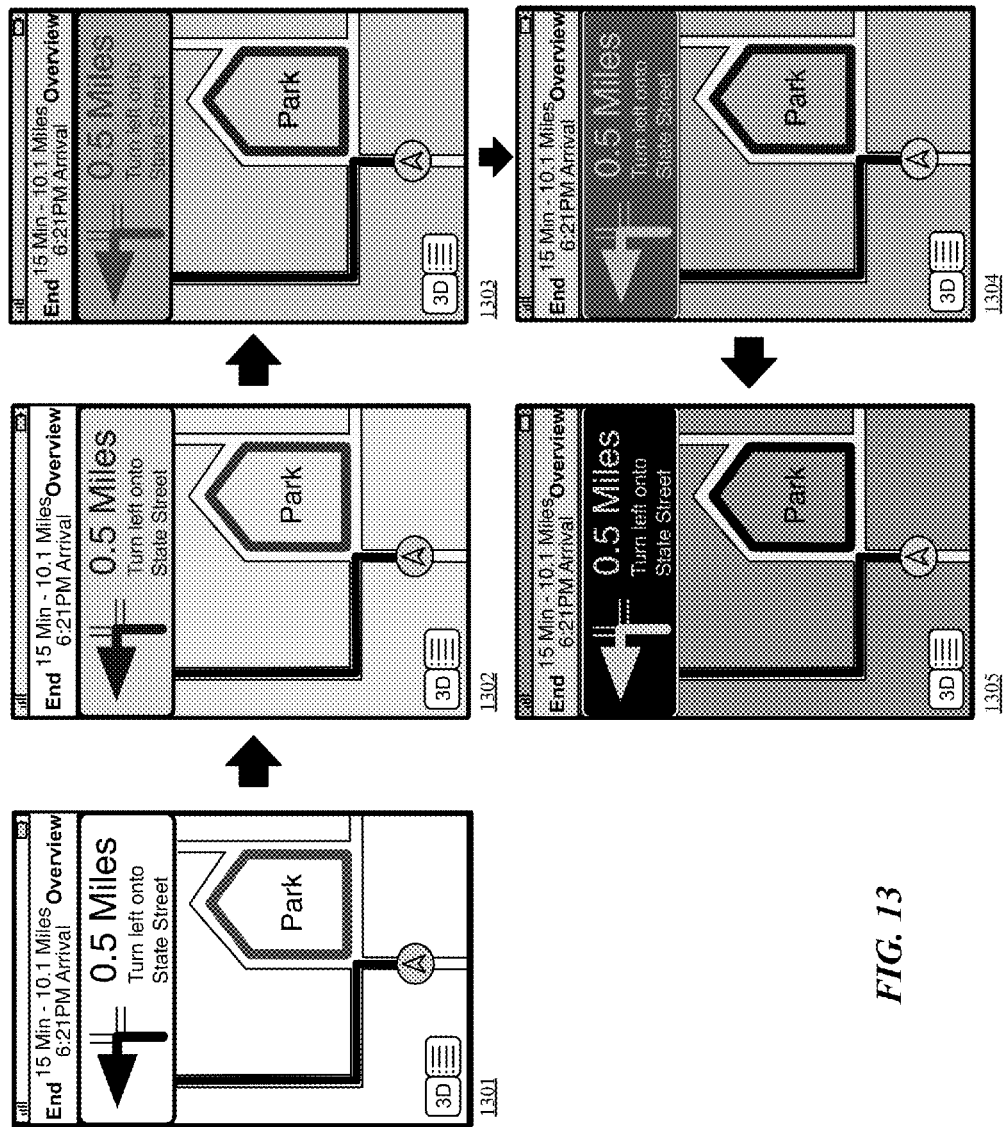
FIG. 13 illustrates an animated change from day mode to night mode.

As mentioned above, in some embodiments, the day mode changes to night mode at sunset in some embodiments. Similarly, the night mode changes to day mode at sunrise in some embodiments. In other embodiments, the modes change when the ambient light goes above or below a threshold level. Whatever the reason for the change between night mode and day mode, some embodiments animate the changes from day mode to night mode and from night mode to day mode. FIG. 13 illustrates an animated change from day mode to night mode. The figure displays five stages in the animation process 1301-1305. In the illustrated embodiment, the application performs the change over a pre-set amount of time by interpolating the day mode style values and the night mode style values. In stages 1301-1305, the application displays areas (e.g., park area 1310) using colors that are weighted averages of the colors of the night and day modes. The weights in the weighted averages begin at 100% day mode and 0% night mode (in stage 1301) and gradually change over the preset time period to 100% night mode and 0% day mode (in stage 1305). In stage 1302, the color of each area is ¾ of the day mode value and ¼ of the night mode value. In stage 1303, the color of each area is ½ of the day mode value and ½ of the night mode value. In stage 1304, the color of each area is ¼ of the value of the day mode and ¾ of the value of the night mode.

Figure 14:
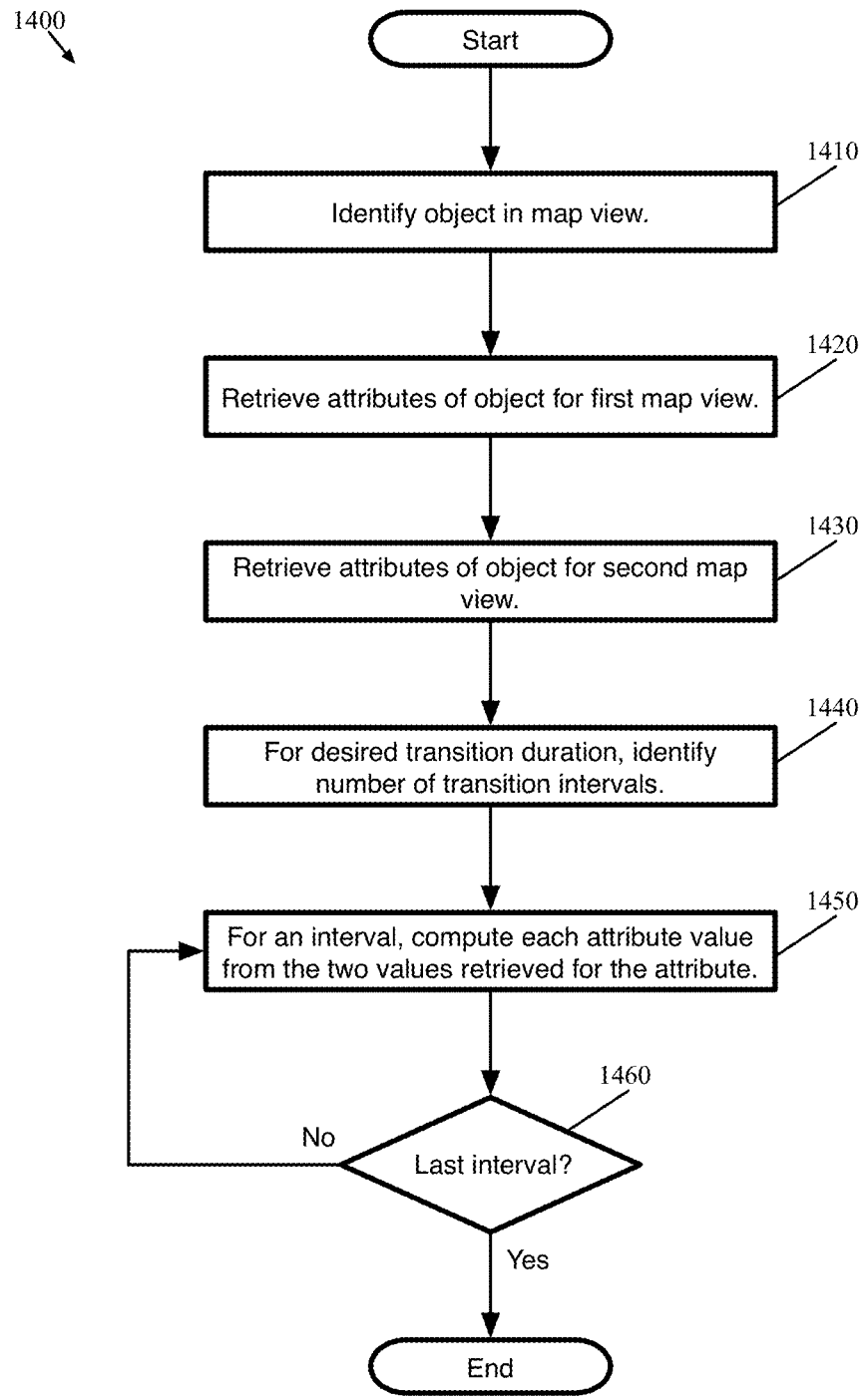
FIG. 14 conceptually illustrates a process of some embodiments for animating a change from one mode to another.

FIG. 14 conceptually illustrates a process 1400 of some embodiments for animating a change from one mode to another. The process 1400 is a process that animates the change of a single object from one mode to another. However, in some embodiments, the application simultaneously animates the change of multiple objects (e.g., all objects in the map view with at least one property that differs from one mode to another).

The process 1400 identifies (at 1410) an object in the map mode. The object may be, for example, a park or a highway. The process 1400 retrieves (at 1420) attributes of the object for a first map mode. An example of such attributes would be the attributes of a day style template (e.g., the fillcolor values of style template 1201 of FIG. 12). The process 1400 then retrieves (at 1430) attributes of the object for a second map mode. An example of such attributes would be the attributes of a night style template (e.g., the fillcolor values of style template 1202 of FIG. 12).

After retrieving the attributes for two map modes, the process 1400 identifies (at 1440) a number of transition intervals for a desired transition duration. For example, in some embodiments the duration is 4 seconds and the animation requires 16 frames per second, resulting in 64 transition intervals. Longer transition times and smoother animation require more intervals. Shorter transition times and less smooth animation require fewer intervals.

The process 1400 then computes (at 1450) each attribute value for a particular interval. For example, the process 1400 could compute a fillcolor value and a strokecolor value based on the values in the day and night modes and the interval being $\frac{1}{64}^{th}$ of the way from day mode to night mode in the first interval. In some embodiments, the interpolation is linear. In other embodiments the applications use other types of interpolations (e.g., an interpolation that is slow at the beginning and end and rapid in the middle). In some embodiments, the styles in the style sheets determine the speed (linear or otherwise) and type (e.g., the color space in which the application performs the interpolations, etc.) of interpolations.

Using the fillcolor fields of the style templates 1201 and 1202 of FIG. 12 as an example, and assuming a linear interpolation, the value of the weighted average would be $\frac{63}{64}^{th}$ of the value of the fillcolor in the day mode (i.e., $\frac{63}{64}^{th}$ of 256, 256, 256, 1 or 252, 252, 252, $\frac{63}{64}^{th}$) plus $\frac{1}{64}^{th}$ of the value of the night mode (i.e., $\frac{1}{64}^{th}$ of 128, 128, 128, 1.0 or 2, 2, 2, $\frac{1}{64}^{th}$) during the first interval. The weighted average values would then be 254, 254, 254, 1.0 for the first interval. That is, the application would display the area as an opaque light gray, barely darker than the pure white of the day mode. That weighted average value for the colors would be displayed for one interval, here $\frac{1}{16}^{th}$ of a second.

The process then determines (at 1460) whether the interval was the last interval of the transition from one mode to another. If the interval was the last interval, then the process 1400 ends. If the interval was not the last interval, then the process 1400 returns to operation 1450 to compute the value for the next interval. In the preceding example, the values for the next interval would be $\frac{62}{64}^{th}$ of the day mode values and $\frac{2}{64}^{th}$ of the night mode values. That is, the weighted averages are 252, 252, 252, 1.0, in the second interval, a slightly darker gray than in the previous interval.

The process 1400 of FIG. 14 describes animating a transition from day mode to night mode performed when the factors that determine which mode to use change from indicating that day mode should be used to indicating that night mode should be used. However, in some embodiments, a transition from day mode to night mode (or from night mode to day mode) occurs more gradually. In some embodiments, when the conditions that determine which mode to use are in an intermediate state, the application displays an intermediate mode that is a weighted average of two modes, with the weight dependent on the actual state of the conditions. That is, some embodiments provide a continuous, gradual transition between day and night modes as a function of ambient light level and/or time of day. For example, in some embodiments, if an ambient light level of 100 (or above) indicates 100% day mode and an ambient light level of 50 (or below) indicates 100% night mode, then an ambient light level of 75 (halfway between 100 and 50) would indicate a 50%-50% blend of the day and night modes. Similarly, an ambient light level of 90 (80% of the way from 50 to 100) would indicate a 20% night mode and 80% day mode blend.

Some embodiments use an animation with interpolation from one style template to another when the application is using style modes that are not based on night and day. The navigation applications of some embodiments can animate any change of styles for any feature of the map that changes only in style from one mode to another (e.g., a road that is different only in style from one mode to another).

For example, in some embodiments the application provides two sets of styles of roads. The application provides one set of styles in a "construction aware mode" that (1)

displays roads with construction in a first color and (2) displays roads that are not under construction in a second color. The application provides a second set of styles in a "construction unaware mode" that displays roads under construction in the same color as roads not under construction. In some embodiments, the application uses the "construction aware mode" when a navigation route includes at least one road under construction. In contrast, the application uses the "construction unaware mode" when a navigation route does not include any roads under construction. A navigation route can change (e.g., when a driver makes a wrong turn and the application recalculates the route) from a route without construction to a route with construction. When the application changes the style from "construction unaware mode" to "construction aware mode", the application animates the change of the roads under construction from the standard road color to the "under construction" color. Another alternate pair of modes would be a mode that displays accidents and a mode that does not display accidents.

Another example of different style templates is a public transit mode. In the public transit mode, the streets are de-emphasized while bus routes and other forms of public transportation are emphasized. In addition to using different colors or textures for the road in public transportation mode, the applications of some embodiments display point of interest identifiers for bus stops, subway stations, and other places used to enter or exit public transportation. Other examples of displaying different identifiers in different modes are described in the next section.

III. Rendering Pipeline

In some embodiments, style templates are stored in a style sheet. The style templates of some embodiments are extracted from the style sheet and used by the application to modify map items (e.g., parks, roads, etc.) when rendering the map items for a display of the device.

Figure 15:
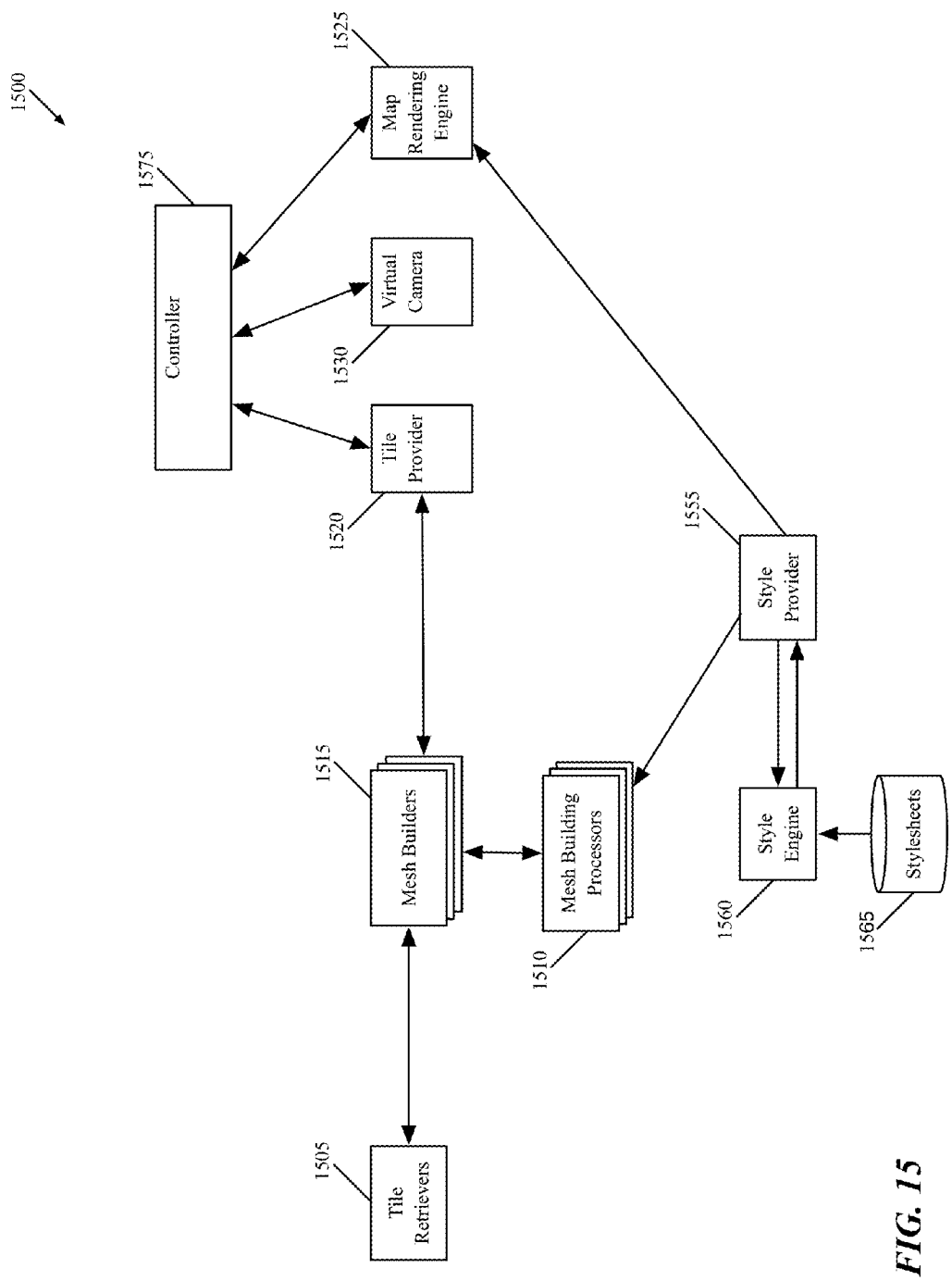
FIG. 15 conceptually illustrates a processing, or map rendering, pipeline performed by the mapping applications of some embodiments in order to render a map for display.

FIG. 15 conceptually illustrates a processing, or map rendering, pipeline 1500 performed by the mapping application of some embodiments in order to render a map for display at the client device (e.g., on the display of the client device). In some embodiments, the map rendering pipeline 1500 may be referred to collectively as a map rendering module. As illustrated, the processing pipeline 1500 includes tile retrievers 1505, a set of mesh builders 1515, a set of mesh building processors 1510, a tile provider 1520, a virtual camera 1530, a map rendering engine 1525, a style provider 1555, a style engine 1560, a style sheet database 1565, and a controller 1575.

The tile retrievers 1505 perform various processes to retrieve map tiles in some embodiments, according to requests for the map tiles from the mesh builders 1515. The mesh builders 1515, as will be described below, identify existing map tiles (that are stored on a mapping service server or in a cache on the device performing the processing pipeline 1500) needed to build their respective meshes. The tile retrievers 1505 receive the requests for the map tiles, determine the best location from which to retrieve the map tiles (e.g., from the mapping service, from a cache on the device) and decompress the map tiles if required.

The mesh builders 1515 (also referred to as tile sources) of some embodiments are instantiated by the tile provider 1520 in order to build different layers of view tiles. Depending on the type of map being displayed by the mapping application, the tile provider 1520 may instantiate a different number and different types of mesh builders 1515. For instance, for a flyover (or satellite) view map, the tile provider 1520 might only instantiate one mesh builder 1515, as the flyover map tiles of some embodiments do not contain multiple layers of data. In fact, in some embodiments, the flyover map tiles contain an already-built mesh generated at the mapping service for which the flyover images (taken by a satellite, airplane, helicopter, etc.) are used as textures. However, in some embodiments, additional mesh builders may be instantiated for generating the labels to overlay on the flyover images when the application is in a hybrid mode. For a 2D or 3D rendered vector map (i.e., a non-satellite image map), some embodiments instantiate separate mesh builders 1515 to build meshes for landcover polygon data (e.g., parks, bodies of water, etc.), roads, place of interest markers, point labels (e.g., labels for parks, etc.), road labels, traffic (if displaying traffic), buildings, raster data (for certain objects at certain zoom levels), as well as other layers of data to incorporate into the map.

The mesh builders 1515 of some embodiments receive "empty" view tiles from the tile provider 1520 and return "built" view tiles to the tile provider 1520. That is, the tile provider 1520 sends to each of the mesh builders 1515 one or more view tiles (not shown). Each of the view tiles indicates an area of the world for which to draw a mesh. Upon receiving such a view tile, a mesh builder 1515 identifies the map tiles needed from the mapping service, and sends its list to the tile retrievers 1505.

Upon receiving the tiles back from the tile retrievers 1505, the mesh builder uses vector data stored in the tiles to build a polygon mesh for the area described by the view tile. In some embodiments, the mesh builder 1515 uses several different mesh building processors 1510 to build the mesh. These functions may include a mesh generator, a triangulator, a shadow generator, and/or a texture decoder. In some embodiments, these functions (and additional mesh building functions) are available to each mesh builder, with different mesh builders 1515 using different functions. In some embodiments, the mesh building processors 1510 use style information provided by the style engine 1560 when building the meshes for different layers. After building its mesh, each mesh builder 1515 returns its view tiles to the tile provider 1520 with its layer of the mesh filled in.

The style engine 1560 generates style templates to apply to different types of areas present on the map under different circumstances. The style engine 1560 can supply night mode templates, day mode templates and templates that are a weighted average of both night mode templates and day mode templates. The application uses the style templates generated by the style engine 1560 to determine the colors and textures of items on the map.

The tile provider 1520 receives from the controller 1575 a particular view (i.e., a volume, or viewing frustum) that represents the map mode to be displayed (i.e., the volume visible from the virtual camera 1530). The tile provider performs any culling (e.g., identifying the surface area to be displayed in the view tile), then sends these view tiles to the mesh builders 1515.

The tile provider 1520 then receives the built view tiles from the mesh builders and, in some embodiments, performs culling on the built mesh using the particular view from the virtual camera 1530 (e.g., removing surface area too far away, removing objects that will be entirely behind other objects, etc.). In some embodiments, the tile provider 1520 receives the built view tiles from the different mesh builders at different times (e.g., due to different processing times to complete more and less complicated meshes, different time elapsed before receiving the necessary map tiles from the tile retrievers 1505, etc.). Once all of the layers of view tiles have been returned, the tile provider 1520 of some embodiments puts the layers together and releases the data to the controller 1575 for rendering.

The virtual camera 1530 generates a volume or surface for the pipeline 1500 to render, and sends this information to the controller 1575. Based on a particular location and orientation from which the map will be rendered (i.e., the point in 3D space from which the user "views" the map), the virtual camera identifies a field of view to actually send to the tile provider 1520. In some embodiments, when the mapping application is rendering the 3D perspective view for navigation, the field of view of the virtual camera is determined according to an algorithm that generates a new virtual camera location and orientation at regular intervals based on the movement of the user device.

The controller 1575 is responsible for managing the tile provider 1520, virtual camera 1530, and map rendering engine 1525 in some embodiments. In some embodiments, multiple tile providers may actually be instantiated, and the controller puts together several view tiles (e.g., map tiles and building tiles) to create a scene that is handed off to the map rendering engine 1525.

The map rendering engine 1525 is responsible for generating a drawing to output to a display device based on the mesh tiles (not shown) sent from the virtual camera. The map rendering engine 1525 of some embodiments has several sub-processes. In some embodiments, each different type of map element is rendered by a different sub-process, with the rendering engine 1525 handling the occlusion of different layers of objects (e.g., placing labels above or behind different buildings, generating roads on top of land cover, etc.). Examples of such rendering processes include a road rendering process, a building rendering process, a label rendering process, a vegetation rendering process, a raster traffic rendering process, a raster road rendering process, a satellite rendering process, a polygon rendering process, a background raster rendering process, etc.

In some embodiments, the style engine provides style data to the mesh building processors 1510 (e.g., in order to draw map objects with different textures or shapes based on the current operation mode) and/or the rendering engine 1525 (e.g., in order to color map objects based on the current operation mode).

The operation of the rendering pipeline 1500 in some embodiments will now be described. Based on user input to view a particular map region at a particular zoom level, the virtual camera 1530 specifies a location and orientation from which to view the map region, and sends this viewing frustum, or volume, to the controller 1575. The controller 1575 instantiates one or more tile providers. While one tile provider 1520 is shown in this figure, some embodiments allow the instantiation of multiple tile providers at once. For instance, some embodiments instantiate separate tile providers for building tiles and for map tiles.

The tile provider 1520 performs any culling necessary to generate an empty view tile identifying regions of the map for which a mesh needs to be built, and sends the empty view tile to the mesh builders 1515, which are instantiated for the different layers of the drawn map (e.g., roads, land cover, POI labels, etc.). The mesh builders 1515 use a manifest received from the mapping service that identifies the different tiles available on the mapping service server (i.e., as nodes of a quadtree). The mesh builders 1515 request specific map tiles from the tile retrievers 1505, which return the requested map tiles to the mesh builders 1515.

Once a particular mesh builder 1515 has received its map tiles, it begins using the vector data stored in the map tiles to build the mesh for the view tiles sent from the tile provider 1520. After building the mesh for its map layer, the mesh builder 1515 sends the built view tile back to the tile provider 1520. The tile provider 1520 waits until it has received all of the view tiles from the various mesh builders 1515, then layers these together and sends the completed view tile to the controller 1575. The controller stitches together the returned tiles from all of its tile providers (e.g., a map mode tile and a building view tile) and sends this scene to the rendering engine 1525. The map rendering engine 1525 uses the information in the map tiles to draw the scene for display.

In some embodiments, the application determines texture information based on style sheet data provided by the style provider 1555. Furthermore, some embodiments also use this style sheet data provided by a style provider 1555 to determine the shadow, triangulation, and or mesh construction data. Using style sheet-driven rendering enables simple modification to many aspects of the map output, because changes to a texture, color, etc. can be made through a minor modification of a style sheet. As a result, textures can be dynamically created on the fly.

A benefit of the style sheet-driven rendering is the facilitation of using different textures for certain types of objects at different zoom levels or geographic regions. For instance, when viewed at a low zoom level (less detail), some embodiments might color a park a simple light green. On the other hand, as the user zooms in to a higher zoom level (more detail), the style sheets indicate to apply a pattern (e.g., a foliage pattern) to the park region. Similarly, patterns at higher zoom levels could be added to buildings, bodies of water, asphalt, urban land cover, etc. This information can be coded into a style sheet and then the mesh builder simply adds the appropriate texture information to a tile mesh based on the zoom level of the tile.

In some embodiments, the style provider receives style data (e.g., a night mode style and a day mode style for a park, etc.) from a style engine 1560. The style engine 1560 retrieves style sheets from a style sheet database 1565 and edits the retrieved style sheets to produce the style data for the style provider 1555 to distribute. In some embodiments, the style engine 1560 sends both night mode styles and day mode styles at all times and the style provider 1555 determines which style mode to provide to the map rendering engine 1525 and the mesh building processors 1510. However, in other embodiments, the style engine determines whether to send a first mode style template (e.g., a day mode style template), a second mode style template (e.g., a night mode style template), or a weighted average of such templates. The style engine 1560 sends a weighted average of the templates when the application is animating a change from one mode to another.

IV. Different Results in Different Modes

The applications of some embodiments provide different data results in different modes. For example, the application produces one set of map content on a map in a day mode and a different set of map content on a map in a night mode.

A. Different Map Content

Map/navigation applications of some embodiments provide map content in multiple layers. In some embodiments, the application provides different layers of map content in day mode than in night mode. For example, some embodiments provide different point of interest identifiers in night mode and day mode. In some embodiments, some types of content are displayed in multiple modes (e.g., some of the content is common to multiple mode-specific layers).

Figure 16:
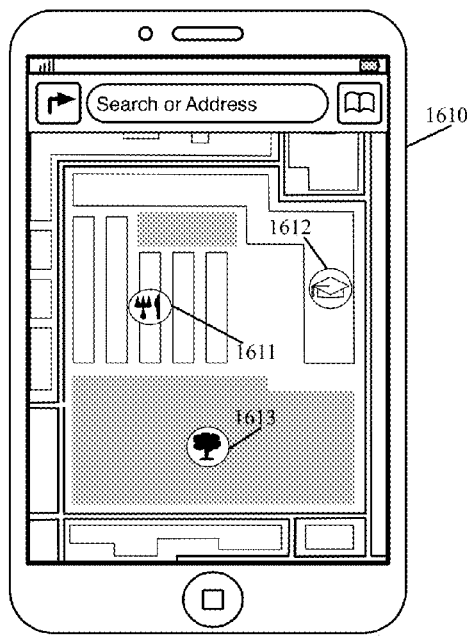
FIG. 16 illustrates a map with different map content layers shown in different modes.
Figure 16:
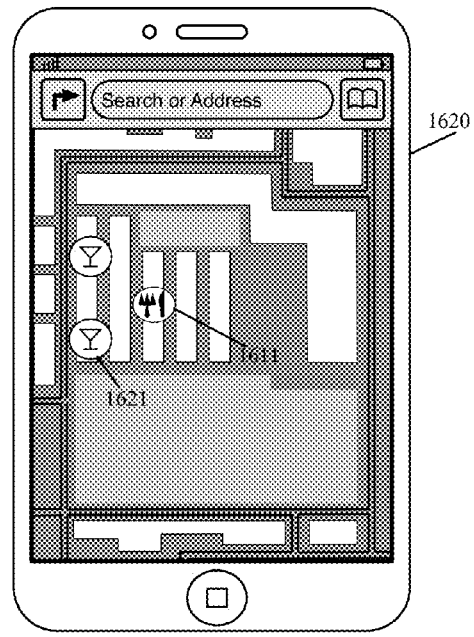
Figure 16:
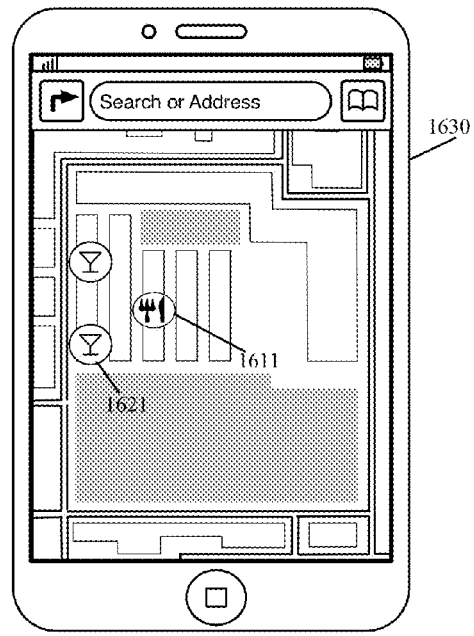

Point of interest identifiers of some embodiments identify different types of locations (e.g., schools, parks, restaurants, etc.). Some embodiments automatically provide such point of interest identifiers even when the locations represented by the map content have not been found as a result of a search. Some embodiments provide maps with different locations emphasized in day mode and night mode. FIG. 16 illustrates a map in different modes with different locations emphasized. The figure includes a day mode 1601, a first night mode 1602, and a second night mode 1603. In the day mode, the map 1610 displays a day mode layer of point of interest identifiers, including a restaurant point of interest identifier 1611, a school point of interest identifier 1612 and a park point of interest identifier 1613.

In some embodiments, some point of interest identifiers are displayed in multiple different modes, but not all point of interest identifiers are displayed in multiple modes. In the first night mode 1602, the map 1620 displays a night mode layer with two bar point of interest identifiers 1621 that the day mode layer did not display in the day mode 1601. In the first night mode 1602, the night mode layer also displays restaurant point of interest identifier 1611, which is also provided in the day mode layer of point of interest identifiers. However, the night mode layer of point of interest identifiers does not display the school point of interest identifier 1612 and the park point of interest identifier 1613. The application displays these point of interest identifiers 1612 and 1613 in day mode 1601, but not night mode 1602, because schools and parks are more likely to be chosen as destinations during the day than at night (and are therefore not in the night layer). Similarly, the map 1620 displays bar point of interest identifiers 1621 in the night mode 1602 but the map 1610 does not display the point of interest identifiers 1621 in the day mode 1601 because bars are more likely to be chosen as destinations during the night than during the day (and are therefore are not in the day layer).

In some embodiments, the application displays some (day oriented) map content only in the day mode and some (night oriented) map content only in the night mode. However, in other embodiments, the application will display day or night oriented map content in the opposite mode under some circumstances (e.g., when the user zooms in past a threshold scale of the item on the map). For example, the application of such embodiments will display a park point of interest identifier in night mode if the user zooms in close enough to the park on the map.

As mentioned above, in some embodiments, the application only uses a night mode when the time is after sunset and the light level is low. However, in some embodiments, there are multiple aspects of night mode, with the use of different aspects each being determined by its own set of factors. For example, one aspect in some embodiments determines which styles to use when displaying a map, while another aspect determines what map content layers (e.g., location identifiers) to display.

In some embodiments, the application determines what styles (e.g., colors and textures for the map) to use based on both time and light levels (e.g., as previously described with respect to FIGS. 6 and 7). Applications of some other embodiments determine whether to use the style determining aspect of the night mode based on light levels, but not on time. However, in some embodiments that use light levels as at least one factor in determining whether to use night mode, the application determines which set of map content layers to display based on the time, but not on the light levels.

One reason applications of some embodiments use different factors to determine whether to use different aspects of a night mode is that different aspects are used for different purposes. For example, the applications of some embodiments provide different colors or textures in night mode than in day mode for reasons of making the map or navigation instructions easy to read in both low light conditions (night mode) and in bright light conditions (day mode). However, the application presents different map content layers based on providing the user with map content more likely to be relevant at the time the application displays the map. The likelihood that a layer of map content is relevant is unlikely to be affected by whether the device is in a bright area or a dark area, but is likely to be affected by the time. Accordingly, in some embodiments, the application sometimes shows day related layers of map content on maps displaying night mode colors or textures. Similarly, the applications of some embodiments sometimes show night related layers of map content on maps displaying the day mode colors or textures.

The second night mode 1603 of FIG. 16 illustrates an embodiment that uses one set of factors to determine whether to display areas of the map in night mode or day mode and uses a different set of factors to determine whether to display point of interest identifiers in night mode or day mode (e.g., to use the night layer or day layer of point of interest identifiers). Specifically, the application uses light levels to determine whether to use night mode or day mode for map areas, and uses time to determine whether to use the night mode layer or the day mode layer for point of interest identifiers. In the case of the first night mode 1602, the device was in the dark, at night time. Therefore, both the map 1620 and the points of interest identifier layer (e.g., the layer with point of interest identifiers 1621) are in night mode. In contrast, in the case of the second night mode 1603, the device was in the light, at night time. Therefore the map 1630 is in day mode but the points of interest identifier layer (e.g., the layer with point of interest identifiers 1621) is in night mode.

Additionally, some embodiments display at least some map content based on the time and a stored set of time parameters. For example, the applications display a point of interest during hours of operation of the point of interest. For example, the map database or the user in some embodiments provides the map/navigation application with the hours of operation for a restaurant and the application displays the point of interest identifier during some or all of those hours and does not display the point of interest identifier outside of those hours.

B. Different Map Search Results

Figure 17:
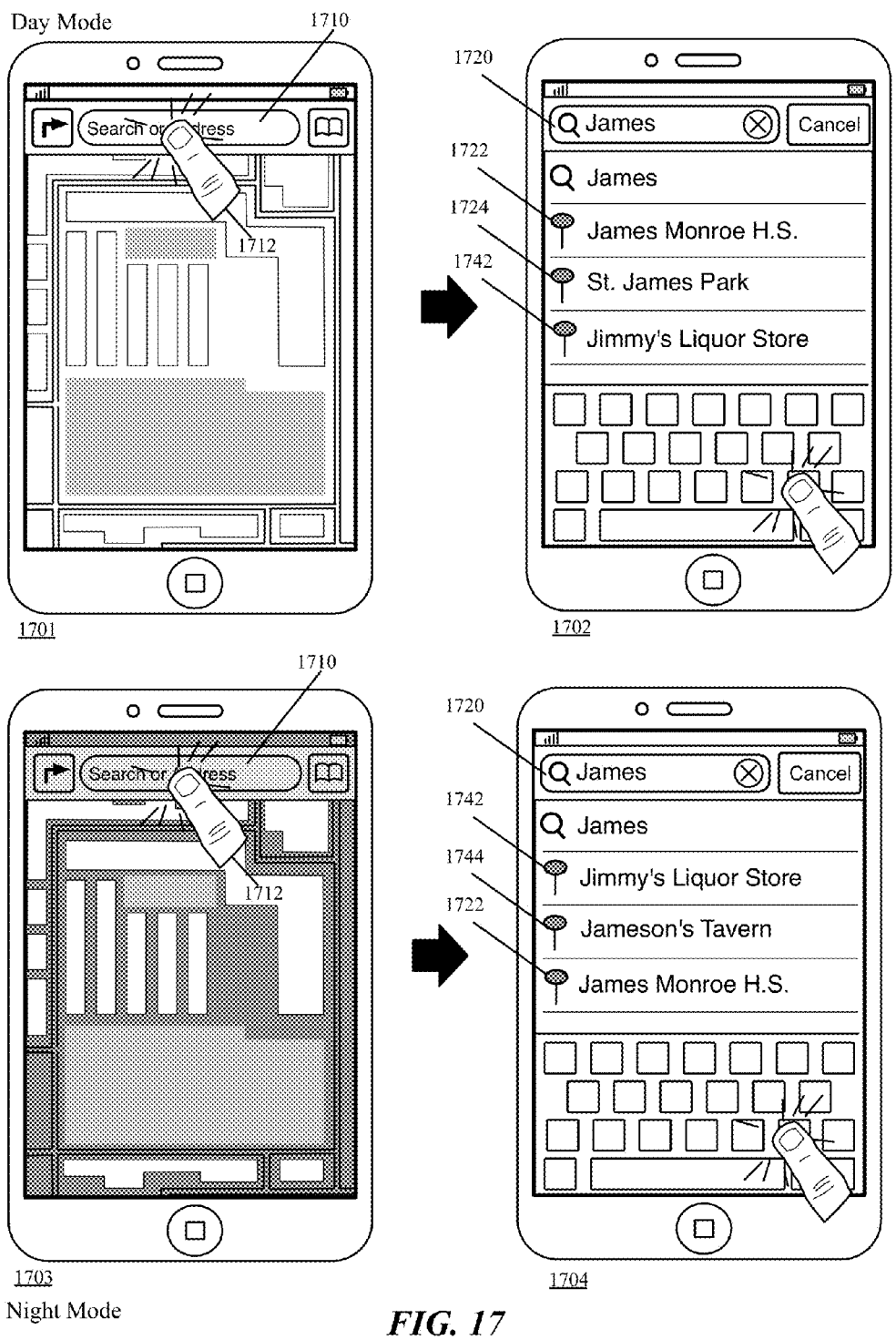
FIG. 17 illustrates a map/navigation application providing different search result orders at night and during the day.

In some embodiments, map searches provide different results when the application is in a night mode than when the application is in a day mode. FIG. 17 illustrates a map/navigation application providing different search results at night than during the day. The figure includes day mode map 1701, daytime search results 1702, night mode map 1703, and nighttime search results 1704. In the day mode map 1701, a user touches the search bar 1710 with finger 1712 to activate a search operation. Daytime search results 1702 show that the user has entered the search term "James" in the search area 1720 and the map/navigation application is displaying the results 1722, 1724, and 1742. Result 1722 is "James Monroe High School"; result 1724 is "St. James Park". These locations are more likely to be relevant during the day. In some embodiments, the application provides the same set of results in both modes, but the mode determines the order of the search results. Accordingly, result 1742 is "Jimmy's Liquor Store", a result more appropriate for a night mode search. The application displays result 1742 in the search results 1702 in day mode, but displays it lower down the list than in results 1704 in night mode.

In the night mode map application 1703, a user touches the search bar 1710 with finger 1712 to activate a search operation. Nighttime search results 1704 show that the user has again entered the search term "James" in the search area 1720 and the map/navigation application is displaying the results 1742, 1744, and 1722. Result 1742 is "Jimmy's Liquor Store"; result 1744 is "Jameson's Tavern". These locations are more likely to be relevant during the night. However, the results include a result 1722 "James Monroe High School" more appropriate for the day mode. The result 1722 is still displayed in the search results 1704, but is displayed lower on the search results list than in results 1702 in day mode.

In the application of FIG. 17, additional results are lower down on the list of results and therefore not seen until a user scrolls to the results. One of ordinary skill in the art will understand that although the applications of some embodiments preferentially display night oriented locations while in night mode, the applications will still find day oriented locations at night. The applications will display the day oriented places further down the list of found locations if the user searches for the same search term in night mode as in day mode (e.g., the user can scroll down the list of search results 1704 to find the day mode related locations while in night mode). Alternatively, if the user makes a more specific search (e.g., for "St. James Park" instead of "James"), the applications will display a day oriented location early on the list even in night mode. Similarly, a search during the day will display night oriented locations further down the list for the same search terms and can still find the night oriented location with more specific search terms. The embodiment of FIG. 17 provides the same set of results in different orders in day mode and night mode. However, the applications of some embodiments provide different sets of results in night mode and in day mode.

Figure 18:
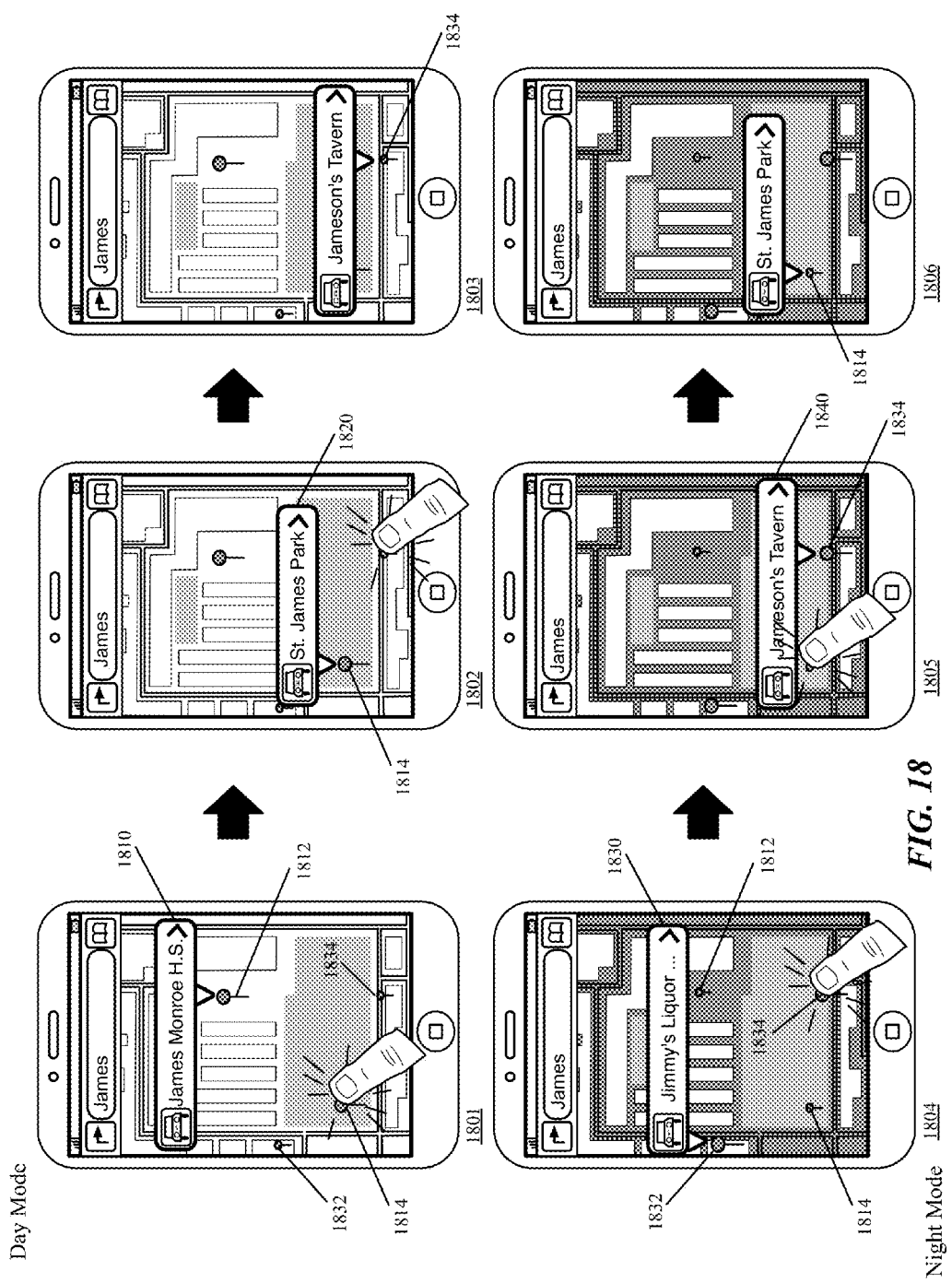
FIG. 18 illustrates the display of search results in night mode and day mode.

The search results can be used with the map application to find locations on the map. FIG. 18 illustrates the display of search results in night mode and day mode. The figure includes day mode maps 1801, 1802, and 1803 and night mode maps 1804, 1805, and 1806. The day mode map 1801 shows a flag 1810 on location pin 1812. The flag 1810 identifies the location of pin 1812 as "James Monroe High School", the first location on the daytime search results 1702 (of FIG. 17). In stage 1801, the user selects location pin 1814 and the map transitions to day mode map 1802, which shows a flag 1820 on location pin 1814. Flag 1820 identifies the location pin 1814 as "St. James Park" the second location on the daytime search results 1702 (of FIG. 17). Although the primary day mode results are shown as large pins 1812 and 1814, in the embodiment of FIG. 18, the primary night mode pins 1832 and 1834 are also shown in the day mode maps 1801 and 1802. In stage 1802, the user selects small pin 1834 and the map transitions to day mode map 1803, displaying a flag on the small pin 1834 identifying the location as "Jameson's Tavern".

The night mode map 1804 shows a flag 1830 on location pin 1832. The flag 1830 identifies the location of pin 1832 as "Jimmy's Liquor Store", the first location on the nighttime search results 1704 (of FIG. 17). The user selects location pin 1834 and the map transitions to day mode map 1805, which shows a flag 1840 on location pin 1834. Flag 1840 identifies the location pin 1834 as "Jameson's Tavern", the second location on the nighttime search results 1704 (of FIG. 17). Although the primary night mode results are shown as large pins 1832 and 1834, in the embodiment of FIG. 18, the primary day mode pins 1812 and 1814 are also shown in the night mode maps 1804 and 1805. In stage 1805, the user selects small pin 1814 and the map transitions to night mode map 1806, displaying a flag on the small pin 1814 identifying the location as "St. James Park".

Although the embodiment of FIG. 18 displays the night related search result location as small pins in day mode (and vice versa), in some embodiments the applications display the night related results in day mode in the same way as day related results (and vice versa). In other embodiments, night oriented search result locations are not displayed at all in day mode and vice versa.

Similarly to the case for the map content layers in FIG. 16, the application of FIG. 18 shifts the search results in night mode from locations that are more likely to be of interest during the day (e.g., schools and parks) to locations that are more likely to be of interest at night (e.g., bars and liquor stores). As described above with respect to FIG. 16, in some embodiments, the aspect of night mode that displays different colors on the map may be triggered by different factors than the aspects of night mode that change search results. For example, the different map colors are triggered in some embodiments (in part or fully) by light levels. In contrast the different search results are triggered in those same embodiments (partly or fully) by the time.

C. Different Search Engine Results

Figure 19:
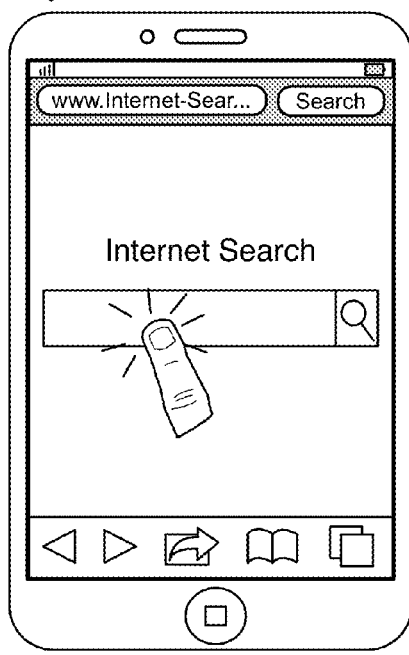
FIG. 19 illustrates a search engine with night and day modes.
Figure 19:
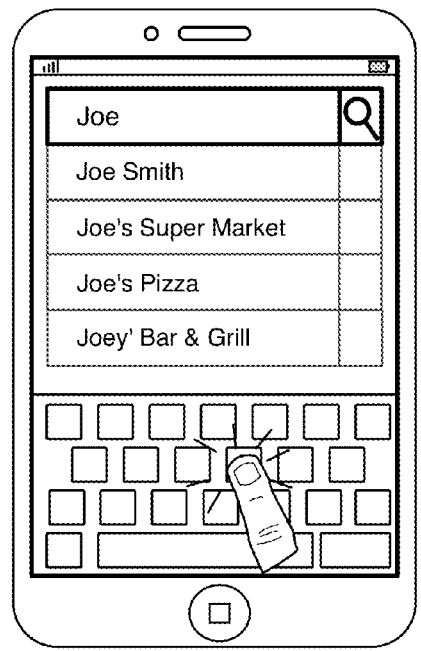
Figure 19:
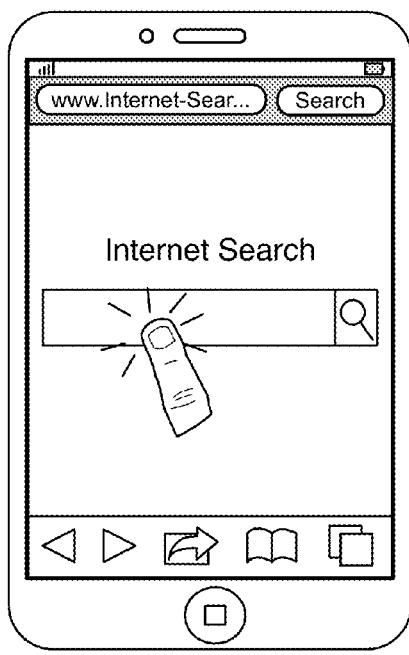
Figure 19:
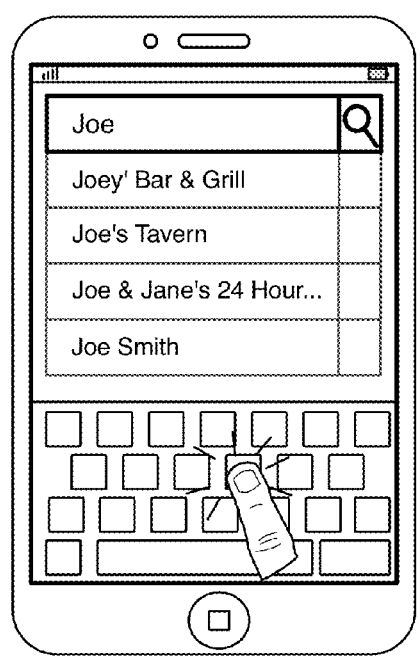

Although the above described embodiments apply night mode and day mode to map/navigation applications of some embodiments, in some embodiments night and day modes are used by other types of applications. For example, in some embodiments, night mode and day mode features apply to search engines. FIG. 19 illustrates a search engine with night and day modes. The search engine 1900 is shown in a day mode 1901 and a night mode 1902. The interface appears the same in the day mode 1901 and the night mode 1902. However, when the user enters the same search query, "Joe", in both modes, the day mode 1901 produces day time results 1903 while the night mode 1902 produces night time results 1904. The day time results 1903 include "Joe Smith", "Joe's Super Market", "Joe's Pizza", and "Joey's Bar and Grill". In contrast the night time results include "Joey's Bar and Grill", "Joe's Tavern", "Joe and Jane's 24 Hour [Gym]", and "Joe Smith". In the illustrated embodiment, the results found by the search in day mode are the same results found in night mode. However, in night mode, the order of the results is different than the order of results in day mode. Therefore, of the four results shown in each mode, the first three of each mode are followed by one of the items ranked high on the other mode. In some embodiments, the user can scroll down the list to see the other results that were top ranked in one mode, but not in the other mode. Although the illustrated mode changes the order, but not the set of found items, in other embodiments, some or all items found on the day mode list may not be found at all on the night mode list and vice versa.

While the illustrated embodiment provides different results during two different time periods, night and day, some embodiments provide different sets of results at multiple sets of time. For example, some embodiments provide four different sets of results in the morning, afternoon, evening, and night, respectively.

Figure 20:
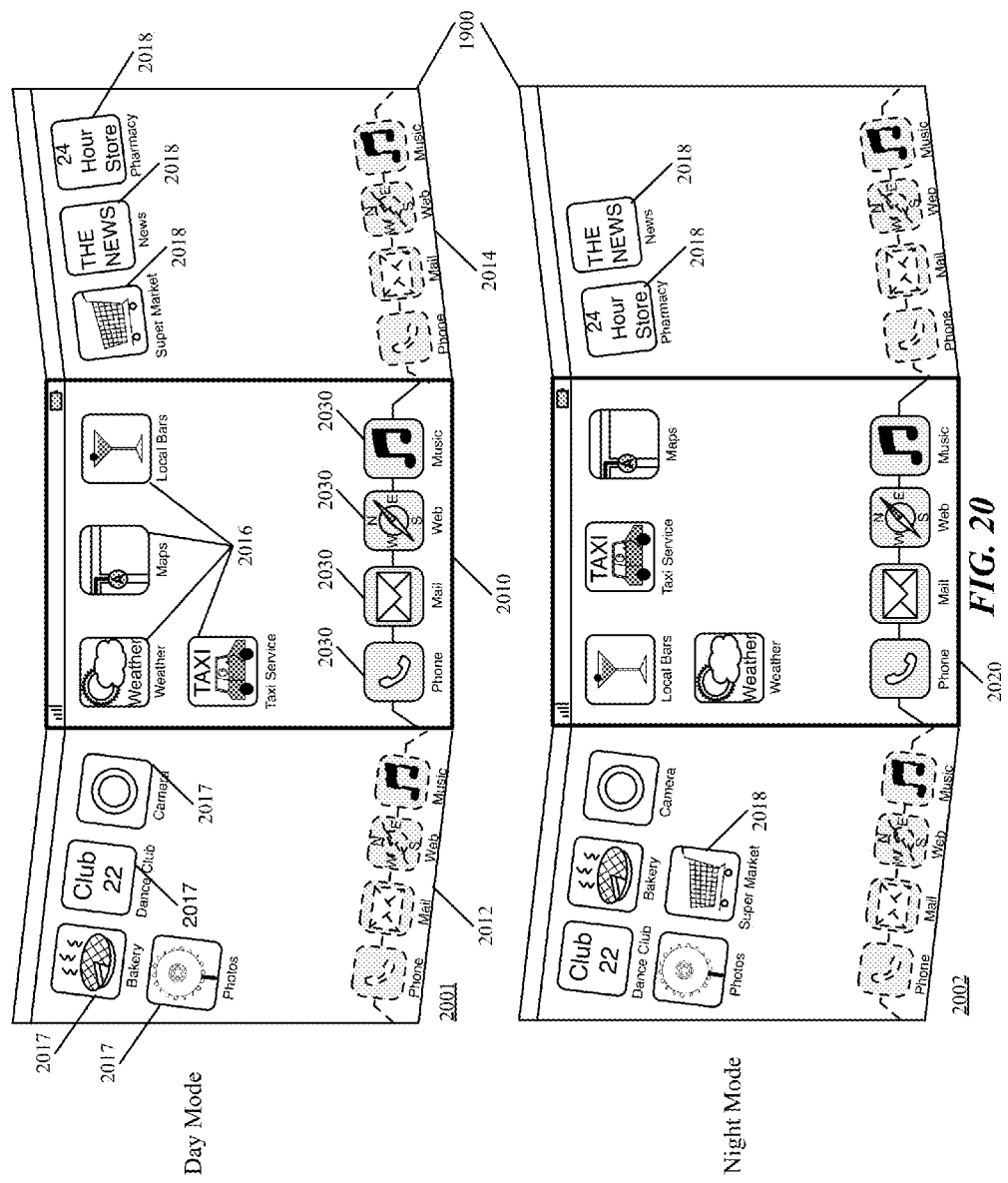
FIG. 20 illustrates a GUI with different night and day modes.

In some embodiments, a graphical user interface (GUI) of an operating system uses a night mode and a day mode. The GUI of some embodiments displays icons for launching applications. FIG. 20 illustrates a GUI 2000 with different night and day modes. The GUI 2000 is shown in a day mode 2001 and a night mode 2002. The central view 2010 in the day mode 2001 shows the icons displayed on a primary application launch view (e.g., the default application launch view displayed when activating the device) in the day mode 2001. The left display view 2012 and the right display view 2014 show the icons on secondary application launch views (e.g., application views that are not the default view, but which the user can switch to). In day mode 2001, the icons 2016 are in a particular order. Icons 2017 are all on the left display view 2012. Icons 2018 are all on the right display view 2014. In night mode 2002, the icons 2016 are displayed in the same central view 2010, but the order of the icons 2016 in the central view 2010 is different. One of icons 2018 has moved to left display view 2012 in night mode 2002 from right display view 2014 in day mode 2001 and the icons 2017 and the remaining icons 2018 have been reordered. In the illustrated embodiment, the bottom row of icons 2030 stays the same in each application launch view and is the same in night mode and in day mode.

In FIG. 20, the bottom row of icons 2030 is the same in night mode and in day mode. However, in some embodiments, the bottom row of icons 2030 is displayed in a different order, or contains different application launch icons in different modes. The embodiment illustrated in FIG. 20 shows icons, except for one of the icons 2018, on the same application launch views, but reordered. However, in some embodiments, multiple different icons are displayed in a different launch view in night mode than in day mode (including icons being added or removed from the primary launch view). In the embodiment of FIG. 20, all icons were shown in both modes, though the order changed.

In some embodiments, some application launch icons are not shown at all during the day, but are shown at night and other application launch icons are shown during the day, but not shown at all at night. In some embodiments, the determination of what icons to place first depends on the time and on the user's history of using different icons at different times. At times when the user tends to use a particular icon, that icon is moved closer to a primary position (e.g., the upper left).

V. Mobile Device

Figure 21:
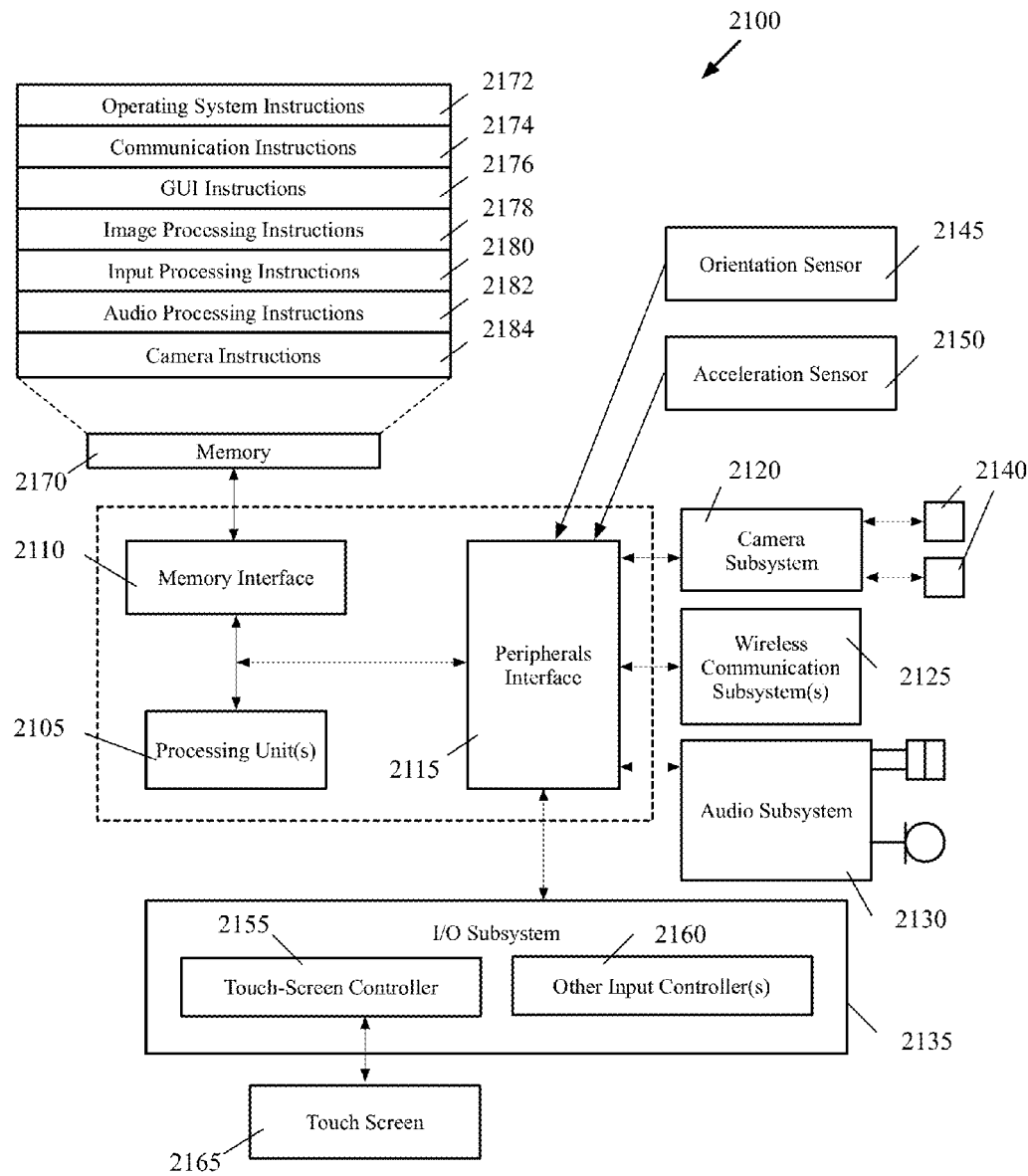
FIG. 21 is an example of an architecture of a mobile computing device that implements applications of some embodiments.

The image organizing, editing, and viewing applications of some embodiments operate on mobile devices, such as smartphones (e.g., iPhones®) and tablets (e.g., iPads®). FIG. 21 is an example of an architecture 2100 of such a mobile computing device. Examples of mobile computing devices include smartphones, tablets, laptops, etc. As shown, the mobile computing device 2100 includes one or more processing units 2105, a memory interface 2110 and a peripherals interface 2115.

The peripherals interface 2115 is coupled to various sensors and subsystems, including a camera subsystem 2120, a wireless communication subsystem(s) 2125, an audio subsystem 2130, an I/O subsystem 2135, etc. The peripherals interface 2115 enables communication between the processing units 2105 and various peripherals. For example, an orientation sensor 2145 (e.g., a gyroscope) and an acceleration sensor 2150 (e.g., an accelerometer) is coupled to the peripherals interface 2115 to facilitate orientation and acceleration functions.

The camera subsystem 2120 is coupled to one or more optical sensors 2140 (e.g., a charged coupled device (CCD) optical sensor, a complementary metal-oxide-semiconductor (CMOS) optical sensor, an ambient light detecting sensor etc.). The camera subsystem 2120 coupled with the optical sensors 2140 facilitates camera functions, such as image and/or video data capturing. In some embodiments one or more of the optical sensors 2140 (e.g., the ambient light sensor) is connected directly to the peripherals interface 2115 rather than connected through the camera subsystem 2120. This ambient light sensor, in some embodiments, provides data used to determine whether to display maps in a night mode or a day mode.

The wireless communication subsystem 2125 serves to facilitate communication functions. In some embodiments, the wireless communication subsystem 2125 includes radio frequency receivers and transmitters, and optical receivers and transmitters (not shown in FIG. 21). These receivers and transmitters of some embodiments are implemented to operate over one or more communication networks such as a GSM network, a Wi-Fi network, a Bluetooth network, etc. The audio subsystem 2130 is coupled to a speaker to output audio (e.g., to output voice navigation instructions). Additionally, the audio subsystem 2130 is coupled to a microphone to facilitate voice-enabled functions, such as voice recognition (e.g., for searching), digital recording, etc.

The I/O subsystem 2135 involves the transfer between input/output peripheral devices, such as a display, a touch screen, etc., and the data bus of the processing units 2105 through the peripherals interface 2115. The I/O subsystem 2135 includes a touch-screen controller 2155 and other input controllers 2160 to facilitate the transfer between input/output peripheral devices and the data bus of the processing units 2105. As shown, the touch-screen controller 2155 is coupled to a touch screen 2165. The touch-screen controller 2155 detects contact and movement on the touch screen 2165 using any of multiple touch sensitivity technologies. The other input controllers 2160 are coupled to other input/control devices, such as one or more buttons. Some embodiments include a near-touch sensitive screen and a corresponding controller that can detect near-touch interactions instead of or in addition to touch interactions.

The memory interface 2110 is coupled to memory 2170. In some embodiments, the memory 2170 includes volatile memory (e.g., high-speed random access memory), non-volatile memory (e.g., flash memory), a combination of volatile and non-volatile memory, and/or any other type of memory. As illustrated in FIG. 21, the memory 2170 stores an operating system (OS) 2172. The OS 2172 includes instructions for handling basic system services and for performing hardware dependent tasks.

The memory 2170 also includes communication instructions 2174 to facilitate communicating with one or more additional devices; graphical user interface instructions 2176 to facilitate graphic user interface processing; image processing instructions 2178 to facilitate image-related processing and functions; input processing instructions 2180 to facilitate input-related (e.g., touch input) processes and functions; audio processing instructions 2182 to facilitate audio-related processes and functions; and camera instructions 2184 to facilitate camera-related processes and functions. The instructions described above are merely exemplary and the memory 2170 includes additional and/or other instructions in some embodiments. For instance, the memory for a smartphone may include phone instructions to facilitate phone-related processes and functions. Additionally, the memory may include instructions for an image organizing, editing, and viewing application. The above-identified instructions need not be implemented as separate software programs or modules. Various functions of the mobile computing device can be implemented in hardware and/or in software, including in one or more signal processing and/or application specific integrated circuits.

While the components illustrated in FIG. 21 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 21 may be split into two or more integrated circuits.

VI. Computer System

Figure 22:
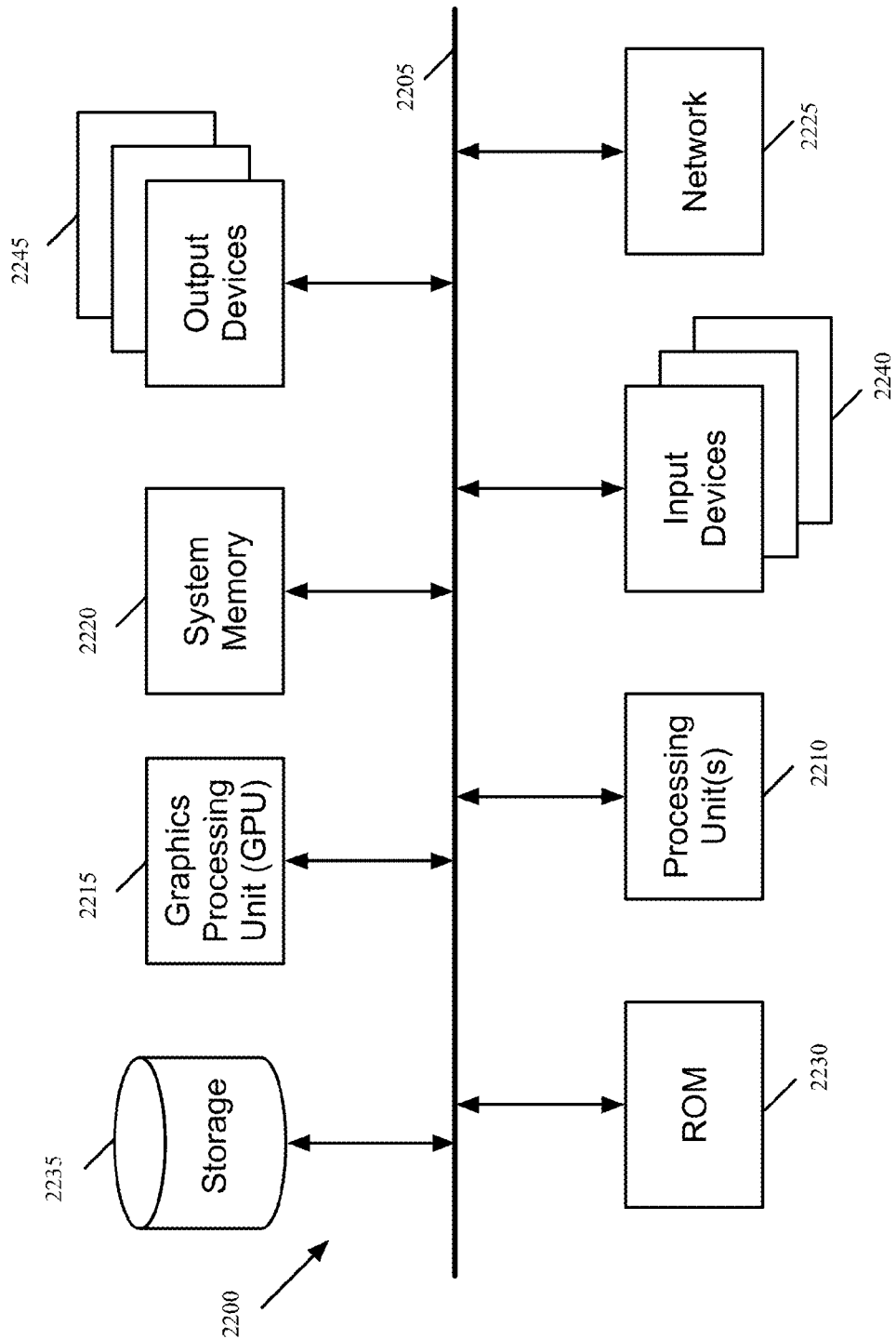
FIG. 22 conceptually illustrates another example of an electronic system with which some embodiments of the invention are implemented.

FIG. 22 conceptually illustrates another example of an electronic system 2200 with which some embodiments of the invention are implemented. The electronic system 2200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2200 includes a bus 2205, processing unit(s) 2210, a graphics processing unit (GPU) 2215, a system memory 2220, a network 2225, a read-only memory 2230, a permanent storage device 2235, input devices 2240, and output devices 2245.

The bus 2205 collectively represents all system, peripheral, and chipset buses that communicatively connect the numerous internal devices of the electronic system 2200. For instance, the bus 2205 communicatively connects the processing unit(s) 2210 with the read-only memory 2230, the GPU 2215, the system memory 2220, and the permanent storage device 2235.

From these various memory units, the processing unit(s) 2210 retrieves instructions to execute and data to process in order to execute the processes of the invention. The processing unit(s) may be a single processor or a multi-core processor in different embodiments. Some instructions are passed to and executed by the GPU 2215. The GPU 2215 can offload various computations or complement the image processing provided by the processing unit(s) 2210.

The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive) as the permanent storage device 2235.

Other embodiments use a removable storage device (such as a floppy disk, flash memory device, etc., and its corresponding drive) as the permanent storage device. Like the permanent storage device 2235, the system memory 2220 is a read-and-write memory device. However, unlike storage device 2235, the system memory 2220 is a volatile read-and-write memory, such a random access memory. The system memory 2220 stores some of the instructions and data that the processor needs at runtime. In some embodiments, the invention's processes are stored in the system memory 2220, the permanent storage device 2235, and/or the read-only memory 2230. For example, the various memory units include instructions for processing multimedia clips in accordance with some embodiments. From these various memory units, the processing unit(s) 2210 retrieves instructions to execute and data to process in order to execute the processes of some embodiments.

The bus 2205 also connects to the input and output devices 2240 and 2245. The input devices 2240 enable the user to communicate information and select commands to the electronic system. The input devices 2240 include alphanumeric keyboards and pointing devices (also called "cursor control devices"), cameras (e.g., webcams), microphones or similar devices for receiving voice commands, etc. The output devices 2245 display images generated by the electronic system or otherwise output data. The output devices 2245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 22, bus 2205 also couples electronic system 2200 to a network 2225 through a network adapter (not shown). In this manner, the computer can be a part of a network of computers (such as a local area network ("LAN"), a wide area network ("WAN"), or an Intranet, or a network of networks, such as the Internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While various processes described herein are shown with operations in a particular order, one of ordinary skill in the art will understand that in some embodiments the orders of operations will be different. For example in the process 1100 of FIG. 11, the order of the determinations of what conditions are present may vary in different embodiments. One of ordinary skill in the art will understand that the invention is not to be limited by the foregoing illustrative details, but rather is to be defined by the appended claims.

What is claimed is:

1. A device comprising:
   a set of processing units for executing sets of instructions;
   a non-transitory machine readable medium for storing a program for displaying map data, the program comprising sets of instructions for:
   determining whether a current time at a current location of the device is before a time specified for sunset at the current location;
   when the current time at the current location of the device is before the time specified for sunset at the current location, displaying the map data in a day mode without regard to an ambient light level;
   when the current time at the current location of the device is after the time specified for sunset at the current location and the ambient light level at the current location of the device is above a threshold level, displaying the map data in the day mode; and
   when the current time at the current location of the device is after the time specified for sunset at the current location and the ambient light level at the current location of the device is below the threshold level, displaying the map data in a night mode,
   wherein the displayed map data comprises a first set of location identifiers displayed for a particular map region when the current time at the current location of the device is before a particular time and a second, different set of location identifiers displayed for the same particular map region when the current time at the current location of the device is after the particular time.

2. The device of claim 1, wherein the sets of instructions for displaying the map in the day mode comprise a set of instructions for displaying the map using a first set of colors and the set of instructions for displaying the map in the night mode comprises a set of instructions for displaying the map using a second set of colors.

3. The device of claim 1, wherein the program further comprises sets of instructions for:
   using a first style template to define colors for displaying instances of a data type in the day mode; and
   using a second style template to define colors for displaying instances of the data type in the night mode.

4. The device of claim 3, wherein the program further comprises a set of instructions for transitioning from the day mode to the night mode by animating a change from displaying instances of the data type using the colors defined by the first style template to displaying instances of the data type using the colors defined by the second style template.

5. The device of claim 1, wherein the program further comprises sets of instructions for determining whether the device is set to override the current time and/or ambient light condition when displaying the map data in one of the day mode and the night mode based on an override setting regardless of the current time and ambient light level.

6. The device of claim 1,
   wherein the first set of location identifiers for a first set of displayed locations are overlaid on the particular map region and the second set of location identifiers for a second set of displayed locations are not overlaid on the particular map region when the current time is before the particular time, and the second set of location identifiers for the second set of displayed locations are overlaid on the particular map region and the first set of location identifiers for the first set of displayed locations are not overlaid on the particular map region when the current time is after the particular time.

7. The device of claim 6, wherein the first and second sets of location identifiers comprise images of pins.

8. The device of claim 6, wherein the program further comprises a set of instructions for displaying text adjacent to at least one location identifier, wherein the text describes the location identified by the location identifier.

9. The device of claim 6, wherein when the current time is earlier than the particular time, a third set of location identifiers for the second set of displayed locations are overlaid on the particular map region, wherein the third set of location identifiers are visually distinguishable from the first set of location identifiers, and when the current time is later than the particular time, a fourth set of location identifiers for the first set of displayed locations are overlaid on the particular map region, wherein the fourth set of location identifiers are visually distinguishable from the second set of location identifiers.

10. The device of claim 9, wherein the location identifiers of the third set of location identifiers are each smaller than the location identifiers of the first set of location identifiers, and the location identifiers of the fourth set of location identifiers are each smaller than the location identifiers of the second set of location identifiers.

11. The device of claim 1, wherein the program further comprises sets of instructions for:
    displaying a first set of search results for a particular location search query when the current time is after the particular time of day; and
    displaying a second set of search results for the particular location search query when the current time is before the particular time of day.

12. The device of claim 11, wherein the program further comprises sets of instructions for:
    displaying images representing the first set of search results for the particular location search query with the displayed map data when the current time is after the particular time of day; and
    displaying images representing the second set of search results for the particular location search query with the displayed map data when the current time is after the particular time of day.

13. The device of claim 11, wherein the first set of search results comprises a reordering of the second set of search results.

14. The device of claim 11, wherein the first set of search results comprises at least one search result not in the second set of search results.

15. The device of claim 1, wherein the program further comprises a set of instructions for presenting an animated transition between two modes of a map, said set of instructions comprising sets of instructions for:
    identifying a first map style template for a first map mode display;
    identifying a second map style template for a second map mode display; and
    presenting a plurality of different map mode displays that gradually transition from the first map mode display to the second map mode display, said presenting comprising interpolating values specified in the first map style template and values specified in the second map style template and successively applying the interpolated values to the plurality of different map mode displays, wherein the first map mode is one of day mode and night mode and the second map mode is the other of day mode and night mode.

16. The device of claim 15, wherein the particular time is sunset at the current location.

17. A method for displaying location identifiers for map locations on a display of a device, the method comprising:
identifying whether a current time at a location of the device is before or after a particular threshold time;
displaying a first set of location identifiers within a particular map region when the current time is after the particular threshold time; and
displaying a second, different set of location identifiers within the particular map region when the current time is before the particular threshold time.

18. The method of claim 17 further comprising displaying text adjacent to at least one location identifier, wherein the text describes the location identified by the location identifier.

19. The method of claim 17, wherein the threshold time is sunset at a current location of the device.

20. The method of claim 17, wherein the first and second sets of location identifiers comprise images of pins at different locations in the particular map region.

21. The method of claim 17 further comprising:
displaying a first set of search results for a particular location search query when the current time is after the particular threshold time; and
displaying a second set of search results for the particular location search query when the current time is before the particular threshold time.

22. A non-transitory machine readable medium storing a program which when executed by at least one processing unit displays map data on a device, the program comprising sets of instructions for:
determining whether a current time at a current location of the device is before a time associated with sunset at the current location;
when the current time at the current location of the device is before a time specified for sunset at the current location, displaying the map data in a day mode without regard to an ambient light level;
when the current time at the current location of the device is after the time specified for sunset at the current location, and the ambient light level at the current location of the device is above a threshold level, displaying the map data in the day mode; and
when the current time at the current location of the device is after the time specified for sunset at the current location, and the ambient light level at the current location of the device is below the threshold level, displaying the map data in a night mode,
wherein the displayed map data comprises a first set of location identifiers displayed for a particular map region when the current time at the current location of the device is before a particular time and a second, different set of location identifiers displayed for the same particular map region when the current time at the current location of the device is after the particular time.

23. The non-transitory machine readable medium of claim 22, wherein the program further comprises a set of instructions for, when the device is interfaced with a vehicle, displaying the map data in a mode specified by the vehicle.

24. The non-transitory machine readable medium of claim 23, wherein the set of instructions for displaying the map data in a mode specified by the vehicle comprises sets of instructions for:
when the vehicle specifies night mode, displaying the map data in the night mode; and
when the vehicle specifies day mode, displaying the map data in the day mode.

* * * * *